(12) United States Patent
Suppanz et al.

(10) Patent No.: US 9,281,747 B2
(45) Date of Patent: Mar. 8, 2016

(54) VOLTAGE REGULATOR CONTROL USING INFORMATION FROM A LOAD

(71) Applicant: Volterra Semiconductor Corporation, Fremont, CA (US)

(72) Inventors: Bradley J. Suppanz, Mountain View, CA (US); Ognjen Djekic, San Francisco, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 188 days.

(21) Appl. No.: 13/928,251

(22) Filed: Jun. 26, 2013

(65) Prior Publication Data

US 2013/0342181 A1 Dec. 26, 2013

Related U.S. Application Data

(60) Provisional application No. 61/690,454, filed on Jun. 26, 2012.

(51) Int. Cl.
*G05F 1/00* (2006.01)
*H02M 3/158* (2006.01)
*H02M 3/156* (2006.01)

(52) U.S. Cl.
CPC .... *H02M 3/1582* (2013.01); *H02M 2003/1566* (2013.01)

(58) Field of Classification Search
USPC ........................... 323/222, 265, 271, 282–285
See application file for complete search history.

(56) References Cited

U.S. PATENT DOCUMENTS

| 5,847,554 | A | 12/1998 | Wilcox et al. |
|---|---|---|---|
| 6,020,729 | A | 2/2000 | Stratakos et al. |
| 6,160,441 | A | 12/2000 | Stratakos et al. |
| 6,225,795 | B1 | 5/2001 | Stratakos et al. |
| 6,278,264 | B1 | 8/2001 | Burstein et al. |
| 6,445,244 | B1 | 9/2002 | Stratakos et al. |
| 6,462,522 | B2 | 10/2002 | Burstein et al. |
| 6,476,589 | B2 | 11/2002 | Umminger et al. |
| 6,664,774 | B2 | 12/2003 | Lethellier |
| 6,713,823 | B1 | 3/2004 | Nickel |
| 7,170,267 | B1 | 1/2007 | McJimsey |

(Continued)

OTHER PUBLICATIONS

Analog Devices, (2007) "Low Duty Cycle, 600 mA, 3 MHz Synchronous Step-Down DC-to-DC Converter," ADP2102 (Product Design Brochure), *Analog Devices, Inc.,* 24 pp.

(Continued)

*Primary Examiner* — Nguyen Tran
(74) *Attorney, Agent, or Firm* — Weaver Austin Villeneuve & Sampson LLP

(57) ABSTRACT

Disclosed are devices, apparatus, circuitry, components, mechanisms, modules, systems, and processes for controlling a voltage regulator in response to information from a load. In some implementations, transient minimizer circuitry is coupled to receive a notification signal indicating a change or an anticipated change in an electrical characteristic of the load. The transient minimizer circuitry is configured to generate a state command signal responsive to the notification signal. The state command signal indicates a state of the voltage regulator. The switching control circuitry is coupled to receive the state command signal from the transient minimizer circuitry. The switching control circuitry is configured to operate switch circuitry to control the state of the voltage regulator in accordance with the state command signal.

39 Claims, 17 Drawing Sheets

(56) References Cited

U.S. PATENT DOCUMENTS

| | | | |
|---|---|---|---|
| 7,245,113 | B2 | 7/2007 | Chen et al. |
| 7,863,875 | B1* | 1/2011 | Guo .................... H02M 3/1584 323/275 |
| 8,018,208 | B1 | 9/2011 | Kahn et al. |
| 8,120,342 | B1 | 2/2012 | Kahn et al. |
| 8,283,902 | B1 | 10/2012 | Kahn et al. |
| 8,629,669 | B2 | 1/2014 | Tournatory et al. |
| 8,779,744 | B2 | 7/2014 | Kahn |
| 2002/0135345 | A1* | 9/2002 | Terashi ........................ 323/283 |
| 2008/0180075 | A1* | 7/2008 | Xie et al. ...................... 323/282 |
| 2012/0025796 | A1 | 2/2012 | Kahn |
| 2012/0025799 | A1 | 2/2012 | Tournatory et al. |
| 2012/0038334 | A1* | 2/2012 | Peng et al. .................... 323/282 |

OTHER PUBLICATIONS

Analog Devices, (2009-2010) "Synchronous Current-Mode with Constant On-Time, PWM Buck Controller," ADP1872/ADP1873 (Product Design Brochure), *Analog Devices, Inc.*, 40 pp.

Chetty, P.R.K. (Copyright 1986) "Switch-Mode Power Supply Design," *TAB Professional and Reference Books*, 5 pp.

Linear Technology, (2008) "2.5A, 10V, Monolithic Synchronous Step-Down Regulator," LTC3602 (Product Design Brochure), *Linear Technology Corporation*, 20 pp.

Maxim, (Oct. 2003) "3A, 1MHz, 1% Accurate, Internal Switch Step-Down Regulator with Power-OK," MAX8505 (Product Design Brochure), *Maxim Integrated Products*, 15 pp.

\* cited by examiner

VOLTAGE REGULATOR CONTROL USING INFORMATION FROM A LOAD

PRIORITY DATA

This patent document claims priority to commonly assigned U.S. Provisional Patent Application No. 61/690,454, titled "Voltage Regulator Control Using Information from a Load", by Suppanz et al., filed on Jun. 26, 2012, which is hereby incorporated by reference in its entirety and for all purposes.

BACKGROUND

This disclosure relates generally to voltage regulators and, more particularly, to the architecture and control mechanisms of switching voltage regulators.

Voltage regulators, such as direct current (DC) to DC converters, are used to provide stable voltages for electronic devices and systems. The general purpose of a voltage regulator is to convert a source voltage, such as the voltage of an alternating current (AC) or DC power source, into the operating DC voltage of an electronic device. By way of example, DC to DC converters can be used in computing and data communications applications including battery management in low power devices, such as routers, switches, servers, laptops and smartphones.

Switching voltage regulators, often referred to as "switching regulators," are a type of DC to DC converter that convert one DC voltage to another DC voltage with efficiency. A switching regulator generates an output voltage by converting an input DC voltage into a high frequency voltage, and filtering the high frequency voltage to produce the output DC voltage.

Conventional switching regulators typically include a switch for alternately coupling and decoupling an unregulated input DC voltage source, such as a battery or intermediate DC bus voltage, to a load, such as an integrated circuit. An output filter, typically including an inductor and a capacitor, is coupled between the switch and the load to filter the output of the switch and thus provide the output DC voltage. Power is transmitted through the switch and into the output filter in the form of discrete current pulses. The switching regulator operates on the principle of storing energy in the inductor during one portion of a cycle and then transferring the stored energy to the capacitor in the next portion of the cycle. The output filter converts the current pulses into a steady load current so that the voltage across the load is regulated.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and process operations for the disclosed inventive devices, apparatus, circuitry, components, mechanisms, modules, systems, and processes.

Like reference numerals and designations in the various drawings indicate like elements.

DETAILED DESCRIPTION

Figure 1A:
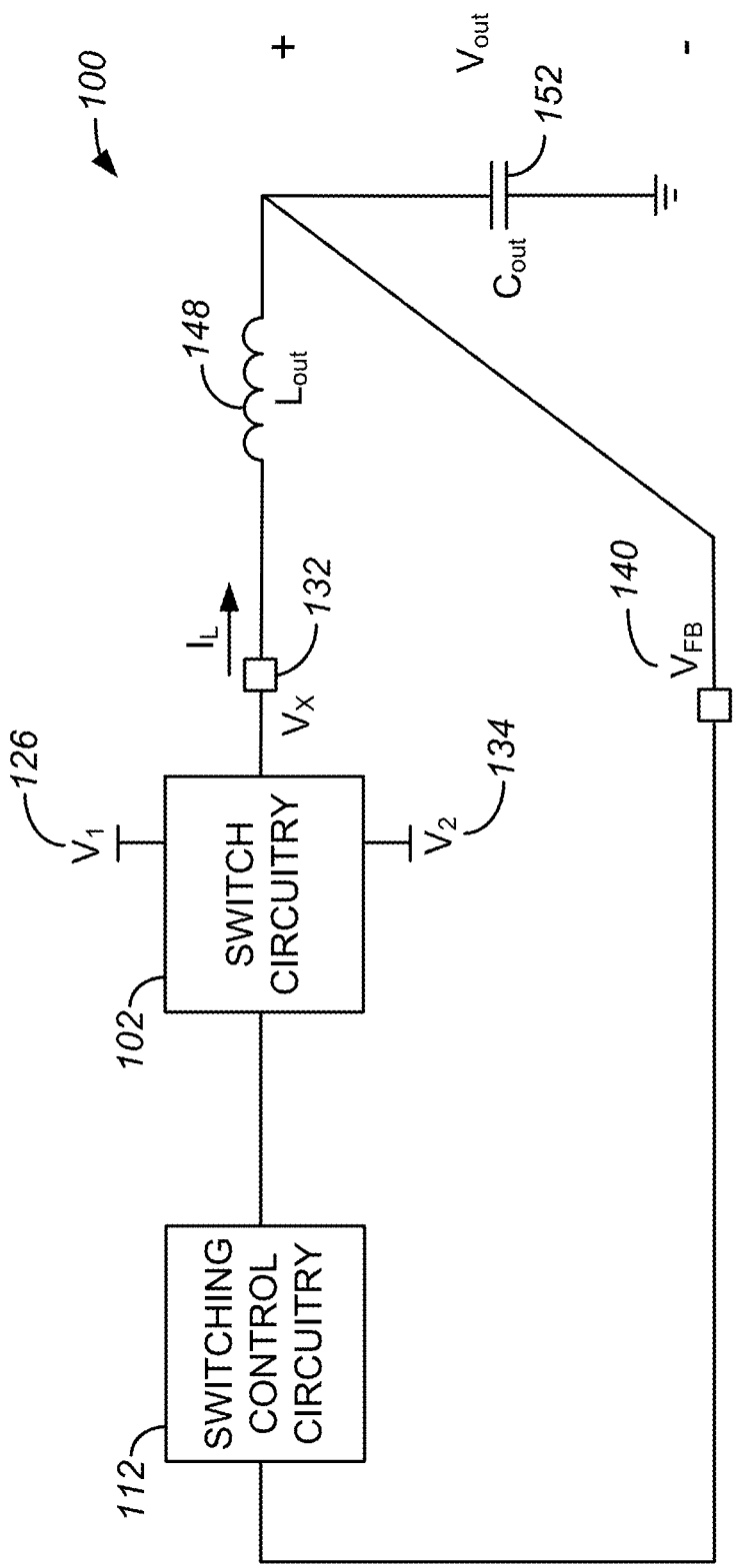
FIG. 1A is a simplified diagram of an example of components of a voltage regulator 100.

Reference will now be made in detail to specific implementations including the best modes contemplated by the inventors. Examples of these implementations are illustrated in the accompanying drawings. While the disclosed subject matter is described in conjunction with these specific implementations, it will be understood that it is not intended to be limited to the described implementations. On the contrary, it is intended to cover alternatives, modifications, and equivalents as may be included within the spirit and scope of the disclosure as defined by the appended claims. In the following description, details are set forth in order to provide a thorough understanding of the disclosed subject matter. The disclosed subject matter may be practiced without some or all of these specific details. In addition, well-known features may not have been described in detail to avoid unnecessarily obscuring the disclosed subject matter.

The disclosed implementations generally relate to and can be incorporated in switching voltage regulators and specific components thereof to facilitate voltage conversion. These implementations are generally described in relation to DC to DC converters that employ buck topologies (also referred to as buck regulators), which convert an input DC voltage to a lower output DC voltage of the same polarity. It should be understood that implementations are contemplated in which other topologies are employed in various combinations.

Implementations of the disclosed devices, apparatus, circuitry, components, mechanisms, modules, systems, and processes provide techniques for controlling a voltage regulator using information from a load such as an application-specific integrated circuit (ASIC) or microprocessor. In some implementations, in response to receiving load change information, a state command provided to control circuitry of the voltage regulator can be defined or altered to affect switching and thereby determine a state of the regulator, such as an output current supplied from the voltage regulator to the load, and thereby compensate for a monitored change or an impending change in one or more electrical characteristics of the load such as a change in current to be pulled by the load. In such instances, the state command generally instructs the voltage regulator circuitry how much current to provide to the load. As explained in greater detail below, a new or altered value of the state command can account for actual or anticipated load electrical characteristic changes such as load current deviations and/or load voltage deviations in response to a notification from the load that such a deviation has occurred or will be occurring.

Those skilled in the art should appreciate that a "state" of the voltage regulator in the context of a state command directly or indirectly affecting the voltage regulator state can refer to the more traditionally understood electrical characteristics of the voltage level generated across a capacitor of the output filter or the level of current through an inductor of the output filter. As used herein, a "state" of a voltage regulator, in the context of a state command, can also refer to a characteristic such as the output current of the voltage regulator, i.e., the current drawn by the load at the output of the voltage regulator. One or more of these various characteristics can be governed by a state command signal as further described in the examples below. For example, a state command signal can cause the inductor current in the output filter to change states from one value to another in response to the information that the load current is changing states to a different value.

In conventional circuits, voltage regulator output voltage transients can occur when the current pulled by the load changes, resulting in a supply voltage transient for a load such as an ASIC or central processing unit (CPU). For instance, a step in the load current can cause voltage deviations. Such a current step can occur when a load such as a CPU begins computing data or otherwise acting on some workload. Load current steps can occur when load circuitry powers-on, for instance, at startup or wakeup.

Some voltage regulators adjust switching in response to detecting a drop or a rise in a voltage at the load. The amount of drop or rise is often determined by the magnitude of the current step at the load and the physical properties of the voltage regulator. Transients can arise due to the voltage regulator architecture, which often has a feedback loop configured to: monitor an output voltage where the voltage regulator is coupled to the load, identify the drop or rise in the voltage, determine an action to take, and respond accordingly. Together with inherent DC to DC converter dynamics, these operations all contribute to a delay, which allows for the voltage at the load to continue to change and for voltage deviations to exist before the voltage regulator can compensate. Some implementations of the disclosed techniques provide for improvement in the voltage supplied from the voltage regulator to the load during a load current transient event by using advance information about changes in load current before they cause deviation of voltage supplied to the load. The voltage regulator uses this advance information to adjust switching action in a way to minimize any deviation in the voltage supplied to the load and thus provide for an improvement in the voltage supplied to the load during a load current transient event.

Output voltage transients are often undesirable, as they can limit the ability of the load to quickly transition between low and high power states or to operate at higher clock frequencies because the voltage regulator cannot maintain the appropriate voltage tolerance at supply pins of the load. Low power states are generally desired to save energy, while fast power state transitions are generally desired to meet peak demands with low latency. Higher clock frequencies are desirable to improve performance of the load. Modern loads in the form of high performance chips often specify stable voltages. Thus, operability and reliability of such chips can be improved by reducing any voltage deviations. To minimize voltage transients, steps in the load current can be limited to a certain amount.

In one example, an ASIC having a number of internal load units can be configured to manage load current by switching on the load units in sequence rather than all at once. With some of the disclosed implementations, there are opportunities for the ASIC to inform the voltage regulator about such impending load current steps. This information can be used to improve the transient response of the voltage regulator thereby improving the performance of the load and the overall end system. With some of the disclosed techniques, the voltage regulator is provided with information about impending load current steps. In other disclosed techniques, not only can the voltage regulator be provided with information about impending load current steps, but also the load can be provided with information about the voltage regulator's switching cycle. In this way, the load current step can be synchronized to a switching event at the switch circuitry of the voltage regulator. Thus, in some implementations, the voltage regulator and the load can be configured to have minimal or no deviations in load voltage during a load transient event. With such transient response improvements, a load such as an ASIC can transition from a low to high power state at a faster rate or operate at a higher clock frequency.

FIG. 1A is a simplified diagram of an example of components of a voltage regulator 100. The voltage regulator 100 includes three main components: switch circuitry 102, switching control circuitry 112, and an output filter including an output inductor 148 and an output capacitor 152. The switch circuitry 102 is coupled to the output filter at a switching node 132, sometimes referred to herein as "node Vx". In particular, switch circuitry 102 has an output coupled to an input of inductor 148 at node Vx. An output of inductor 148 is coupled to a first terminal of output capacitor 152, while a second terminal of output capacitor 152 is coupled to ground. The output capacitor 152 can be coupled to a load (not shown) such as a microprocessor, ASIC, or other integrated circuit.

In FIG. 1A, switch circuitry 102 controls the flow of current into inductor 148 of the output filter at node Vx. This inductor current is referred to herein as "$I_L$". The switch circuitry 102 is generally configured to alternately couple the output filter at node Vx to a first voltage 126 ("$V_1$") and a second voltage 134 ("$V_2$"). In one example, $V_1$ can be an input voltage source to be regulated, and $V_2$ can be another voltage, such as ground. In some implementations, one or more drivers can be coupled to an input of switch circuitry 102, that is, between switching control circuitry 112 and switch circuitry 102, as further described below with reference to FIG. 1B.

In FIG. 1A, switching control circuitry 112 is operatively coupled to control the alternate switching of switch circuitry 102 between $V_1$ and $V_2$ responsive to a feedback signal from the output filter. In the illustrated example, switching control circuitry 112 has an input coupled to sense a feedback voltage 140 ("$V_{FB}$") at the output filter, that is, at a node between inductor 148 and capacitor 152, and an output coupled to the input of switch circuitry 102 to control the switching of switch circuitry 102 responsive to the sensed $V_{FB}$. Thus, switching control circuitry 112 forms a feedback loop from the output of inductor 148 to the input of switch circuitry 102 in this example. In alternative implementations, the input of switching control circuitry 112 can be coupled to other nodes of voltage regulator 100, such as node $V_X$.

Figure 1B:
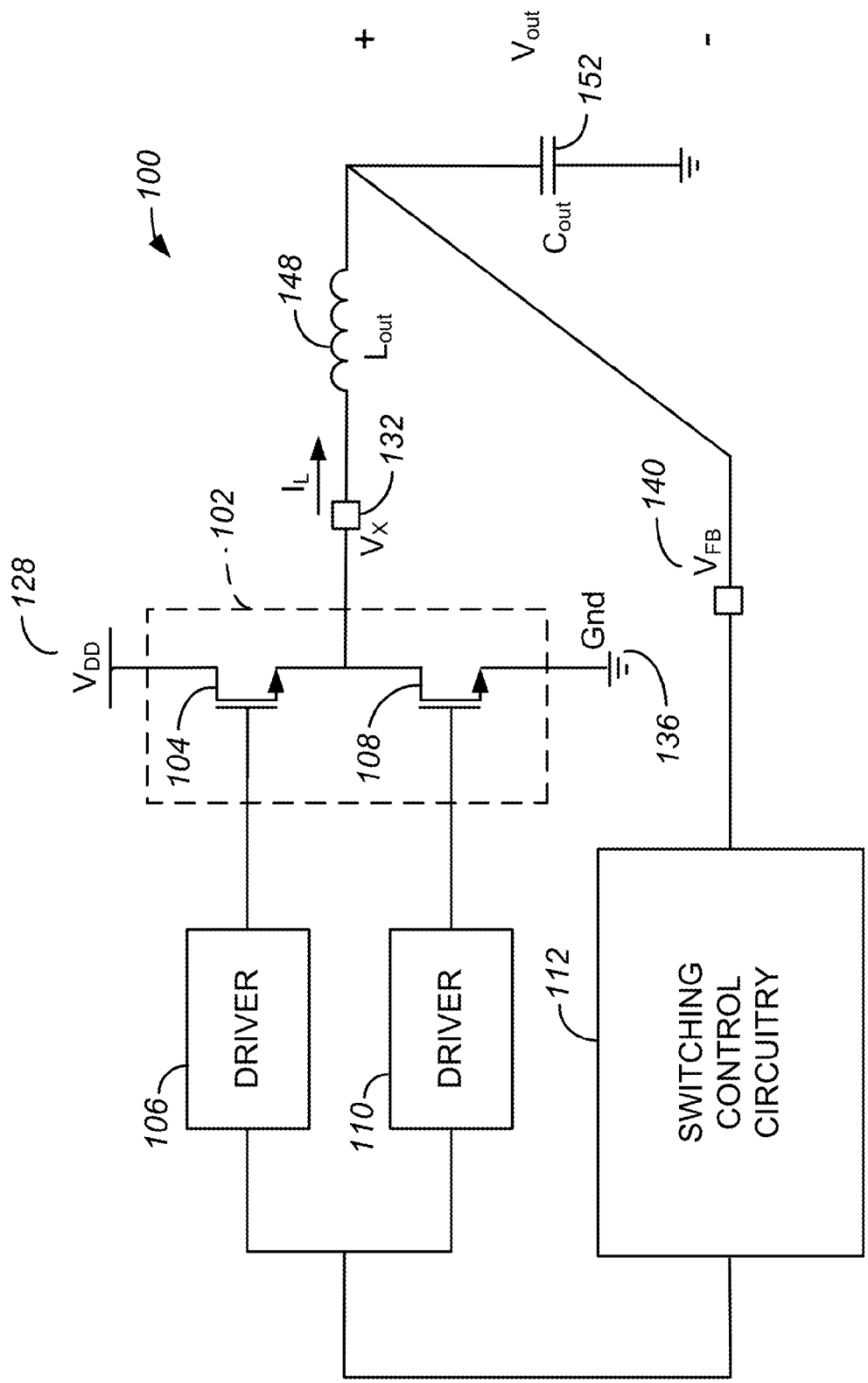
FIG. 1B is a simplified diagram of components of voltage regulator 100, showing one example of switch circuitry and drivers.

FIG. 1B is a simplified diagram of components of voltage regulator 100, showing one of many examples of switch circuitry and drivers. In this example, switch circuitry 102 incorporates a "high side" switch component 104, such as a transistor, and a "low side" switch component 108, such as a transistor or a diode. Here, high side switch component 104 is coupled to an input voltage 128 ("$V_{DD}$"), while low side switch component 108 is coupled to ground ("Gnd") 136. As used herein, a high side or low side switch component can be referred to as a high side or low side "switch."

In FIG. 1B, high side switch 104, in the form of a transistor, is configured to selectively couple the output filter at node Vx to $V_{DD}$, while low side switch 108, in the form of a separate transistor, is configured to selectively couple the output filter at node Vx to Gnd. One or more drivers can be included in voltage regulator, such as an upper driver 106 and a lower driver 110 of FIG. 1B. The driver(s) generally include circuitry and logic configured to drive the switching of switch circuitry 102 between $V_1$ and $V_2$. The driver(s) can also include protection circuitry, and other various analog and/or digital circuitry to monitor voltages and interact with components of switch circuitry 102. Depending on the desired implementation, the drivers can be located on the same or a different chip from switch circuitry 102, and/or located on the same or a different chip from switching control circuitry 112.

In FIG. 1B, upper driver 106 is coupled to a gate of the transistor serving as high side switch 104, and lower driver 110 is coupled to a gate of the transistor serving as low side switch 108. The drivers 106 and 110 are configured to drive the alternate on/off switching of high side switch 104 and low side switch 108 so node Vx is alternately coupled between $V_{DD}$ and ground. The drivers 106 and 110 have inputs coupled to the output of switching control circuitry 112 so that switching control circuitry 112 causes drivers 106 and 110 to alternate between: (i) switching high side switch 104 on while low side switch 108 is switched off, and (ii) switching low side switch 108 on while high side switch 104 is switched off. The relative time spent with the high side switch enabled compared to the low side switch enabled determines an output voltage ("Vout") developed across capacitor 152 of the output filter. In FIG. 1B, drivers 106 and 110 are configured to cooperate with one another in controlling the high side switch 104 and low side switch 108 states, for example, to ensure both are not turned on at the same time.

A transistor incorporated into a high side or low side switch of switch circuitry 102 as described above can be implemented as a FET, such as a metal oxide semiconductor field effect transistor ("MOSFET"), as illustrated in FIG. 1B. The high side FET(s) of high side switch 104 can be p-channel or n-channel, depending on the desired implementation. In an alternative implementation, a different type of transistor is used, such as a junction gate field effect transistor ("JFET"). In the example of FIG. 1B, while high side switch 104 is illustrated as one FET, high side switch 104 can be implemented to include one or more transistors, such as n-channel FETs, and low side switch 108 can also be implemented to include one or more transistors, such as n-channel FETs. For example, high side switch 104 could include a number of transistors coupled in parallel and acting in unison. The node Vx at the output of switch circuitry 102 is situated between the high side FET and the low side FET, in this implementation, between the source of the high side FET and the drain of the low side FET.

Figure 2A:
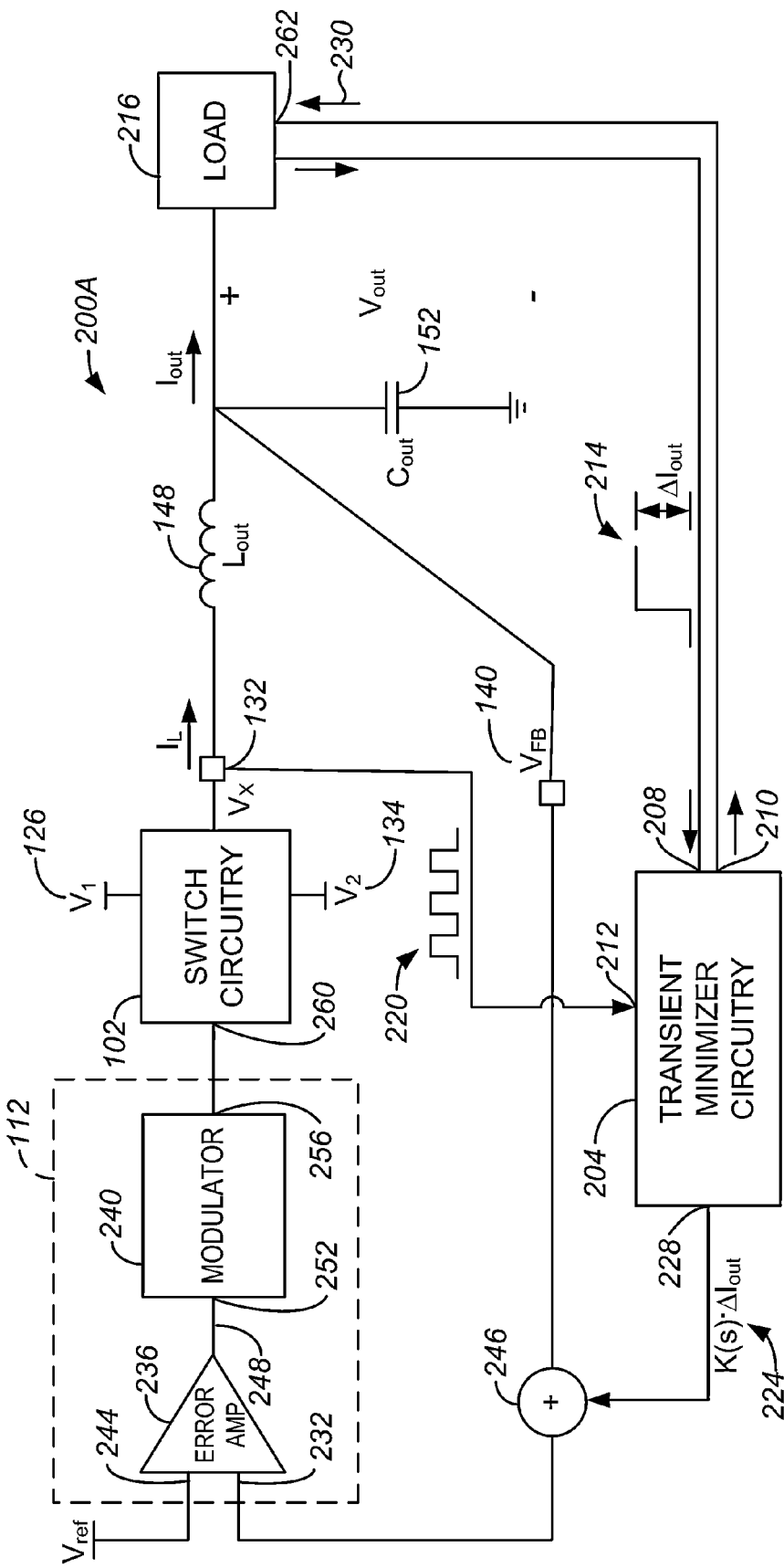
FIG. 2A is a simplified diagram of an example of components of a voltage regulator 200A including transient minimizer circuitry, according to some implementations.

FIG. 2A is a simplified diagram of an example of components of a voltage regulator 200A including transient minimizer circuitry, according to some implementations. In FIG. 2A, voltage regulator 200A includes components described above, in addition to transient minimizer circuitry 204, which has a load input 208 and a switching frequency and switching event input 212 in this example. The load input 208 is coupled to receive a current change notification signal 214 from a load 216. The switching frequency and switching event input 212 is coupled to receive indications of switching frequency and switching events at switch circuitry 102, for instance, as described above with reference to FIGS. 1A and 1B.

In some implementations, such as the example of FIG. 2A, switching frequency and switching event input 212 is coupled to receive a signal 220 indicating switching frequency and switching events of the voltage regulator. In some instances, signal 220 conveys the switching frequency, Fsw, of switch circuitry 102. For example, signal 220 can be in the form of a pulse train. Switching events can be indicated by rising and falling edges representing respective changes in a voltage of switch circuitry 102. The pulse train can inform Fsw of switch circuitry 102. In one example, as shown in FIG. 2A, switching frequency and switching event input 212 of transient minimizer circuitry 204 can be coupled to node Vx.

In some implementations, transient minimizer circuitry 204 can be configured to respond to current change notification signal 214 by generating a state command signal 224 synchronized with a load trigger signal 230 and switching frequency and switching event signal 220 described above. The state command signal 224 is provided at an output 228 of circuitry 204, while load trigger signal 230 is provided at a load trigger output 210 of circuitry 204, where output 210 is connected to an input 262 of load 216. In the present example, when transient minimizer circuitry 204 generates state command signal 224 synchronized with load trigger signal 230, load trigger signal 230 indicates to load 216 when voltage regulator 200A is ready for the desired load change and instructs load 216 to make the change. It is anticipated that the relative timing of state command signal 224 and load trigger signal 230 may need to be adjusted to account for individual system delays, such as propagation delays in any of the various system components.

In some implementations, transient minimizer circuitry 204 is configured to synchronize state command signal 224 and load trigger signal 230 with Fsw of switch circuitry 102, where Fsw is communicated by signal 220. In some other implementations, transient minimizer circuitry 204 is configured to synchronize state command signal 224 and load trigger signal 230 with switching events of switch circuitry 102, indicated by rising or falling edges of signal 220. In some other implementations, transient minimizer circuitry 204 can be configured to use current change notification signal 214 with switching frequency and switching event signal 220 to generate state command signal 224 at output 228 based on a specified formula, such as the inverse transfer function of an error amplifier of switching control circuitry 112, described in greater detail below, or a function tailored to further optimize the system response.

In FIG. 2A, current change notification signal 214 provides advance notice of an anticipated change in current to be drawn by load 216. The current change notification signal 214 can have various forms, depending on the particular load and configuration of transient minimizer circuitry 204. For instance, when load 216 is a microprocessor, current change notification signal 214 can be a digital signal. In other instances, signal 214 is an analog signal. The state command signal 224 can have the same format and communicate the same information as current change notification signal 214, in some implementations. In one example, when notification signal 214 is a digital signal and transitions from '0' to '1', state command signal 224 can similarly go to a digital '1'.

In other examples, switching frequency and switching event input 212 of transient minimizer circuitry 204 can be coupled to sense switching frequency and switching events at sources for such information other than node Vx, for instance, at switch circuitry 102, such as the gate of a FET serving as the high side switch component, or at driver(s) 106 and 110 of FIG. 1B. The sensed switching frequency and switching events can also be derived from Iout, and/or can be monitored at other nodes in the voltage regulator circuitry.

In some implementations, a load can have a known load current step. Thus, it can be sufficient that state command signal 224 indicate only load change timing information. For instance, when switching frequency and switching event signal 220 is in the form of a pulse train, as illustrated in FIG. 2A, transient minimizer circuitry 204 can generate and output state command signal 224 at output 228 to provide an instruction to switching control circuitry 112 and output a load trigger signal 230 at load trigger output 210 to provide an instruction to load 216, for instance, on a rising edge of the pulse train. It is anticipated that the timing between the state command and load trigger signals may be adjustable in order to obtain optimal results. In an alternative configuration, transient minimizer circuitry 204 can synchronize state command signal 224 with a trailing edge of the pulse train. Thus, in implementations where an amount of change, Δ, in Iout is known, a step in signal 214 can convey enough information to generate an appropriate state command signal 224 and load trigger signal 230.

In some other implementations, state command signal 224 also indicates magnitude of load change information in addition to load change timing information. For instance, in FIG. 2A, the amount of change, Δ, in increasing or decreasing Iout, which the load will be pulling, can be indicated by current change notification signal 214. In one example, current change notification signal 214 has a step waveform, where the magnitude of change in the step of signal 214 indicates the anticipated magnitude of load current change, ΔIout. I In some implementations, transient minimizer circuitry 204 includes scaling and signal conditioning circuitry to provide appropriate current and/or voltage scaling and other signal conditioning such as level shifting of state command signal 224. Scaling and conditioning can be desirable to ensure that switching control circuitry 112 can identify and process the timing and, in some implementations, magnitude information conveyed by state command signal 224. In the example of FIG. 2A, scaling and signal conditioning is represented with the value, K(s), applied to ΔIout.

In other implementations, the magnitude of the load current step may not be known, and current change notification signal 214 is configured to convey only the timing of a significant load current transient. In this case, transient minimizer circuitry 204 can be configured to generate a state command 224 of predetermined magnitude, which may not equal the exact magnitude of the load current step. For example, transient minimizer circuitry 204 can be configured so state command signal 224 indicates an approximated level of state change.

In the example of FIG. 2A, switching control circuitry 112 has an input 232 coupled to receive state command signal 224. In this way, switching control circuitry 112 is configured to operate switch circuitry 102 in response to state command signal 224. The resulting Vout and Iout are corresponding new states of voltage regulator 200A. Thus, transient minimizer circuitry 204 is configured to cause control circuitry 112 to operate switch circuitry 102 of voltage regulator 200A to operate in an appropriate manner to change the value of Iout, for instance, when an event is about to occur at the load that would call for that change.

In some implementations, as shown in FIG. 2A, switching control circuitry 112 includes an error amplifier 236 and a modulator 240. In the example of FIG. 2A, error amplifier 236 has a first input 244 coupled to a reference voltage, Vref, and a second input 232 as mentioned above. The second input 232 of error amplifier 236 is also coupled to sense $V_{FB}$, which indicates Vout of regulator 200A. In some implementations, as shown in FIG. 2A, second input 232 is coupled to a summing node 246, which is coupled to add the state command signal 224 to $V_{FB}$. Such configurations can be desirable when transient minimizer circuitry 204 is added to an existing voltage regulator. In this way, the voltage at second input 232 of error amplifier 236 is a combination of $V_{FB}$ and the state command signal. The error amplifier 236 also has an output 248. The error amplifier 236 is configured to determine a difference between the signals at first and second inputs 244 and 232 to generate an amplified error signal at output 248.

Those skilled in the art should appreciate that error amplifier 236 of switching control circuitry 112 configured as illustrated in FIG. 2A represents one of various implementations of circuitry for generating an error signal or amplified error signal in accordance with the disclosed implementations. For instance, error amplifier 236 in switching control circuitry 112 of FIG. 2A could be replaced with error amplifier circuitry in which first input 244 is omitted. In such an example, an error amplifier having neither a Vref input nor a corresponding pin on a chip in which the error amplifier is fabricated can be used, for instance, on chips in which Vref can be generated internally. In some implementations, the Vref value can be generated by a voltage source, while in some other implementations, Vref can be generated by providing a current source to a resistor. These and other various circuit configurations for generating an error signal are considered within the scope of the present disclosure.

In FIG. 2A, modulator 240 has an input 252 coupled to receive a current command signal including the error signal from error amplifier 236. The modulator 240 is configured to generate a control signal at an output 256, which is coupled to an input 260 of switch circuitry 102. The control signal is thus provided by switching control circuitry 112 to cause switching events at switch circuitry 102 to affect the state of voltage regulator 200A in response to the current command signal. The circuitry implementing modulator 240 can have various configurations, depending on the desired control scheme of voltage regulator 200A. Examples of appropriate control schemes include hysteretic voltage or current control, current mode control, peak or valley current mode control, constant on-time control, constant off-time control, average current mode control, and voltage mode control. In some implementations, modulator 240 can have additional inputs where state changes can be inserted, such as current sense inputs. The state command signal 224 can be injected into a current sense input of modulator 240 or other appropriate modulator inputs to cause modulator 240 to operate switch circuitry 102 in a manner to produce the new desired state of Iout of the voltage regulator 200A.

FIGS. 2B-2E show timing diagrams of examples of waveform geometries of voltages and currents of various voltage regulators as described herein. The illustrated waveforms were generated in a simulation of a hysteretic current-mode controller. In each of FIGS. 2B-2E, Vout is illustrated twice—first with a waveform 282 showing a shape of Vout when transient minimizer circuitry is included, and second with an alternative waveform having undershoot 274 and/or overshoot 278 when transient minimizer circuitry is omitted. As explained above, the regulator circuitry can be modified with transient minimizer circuitry, so that load current step information is provided in the form of a current change notification signal. In the illustrated examples of Vout when transient minimizer circuitry is included, the transient minimizer circuitry is configured to synchronize a state command signal to a rising or falling edge of a pulse train monitored at node Vx as described above.

Figure 2B:
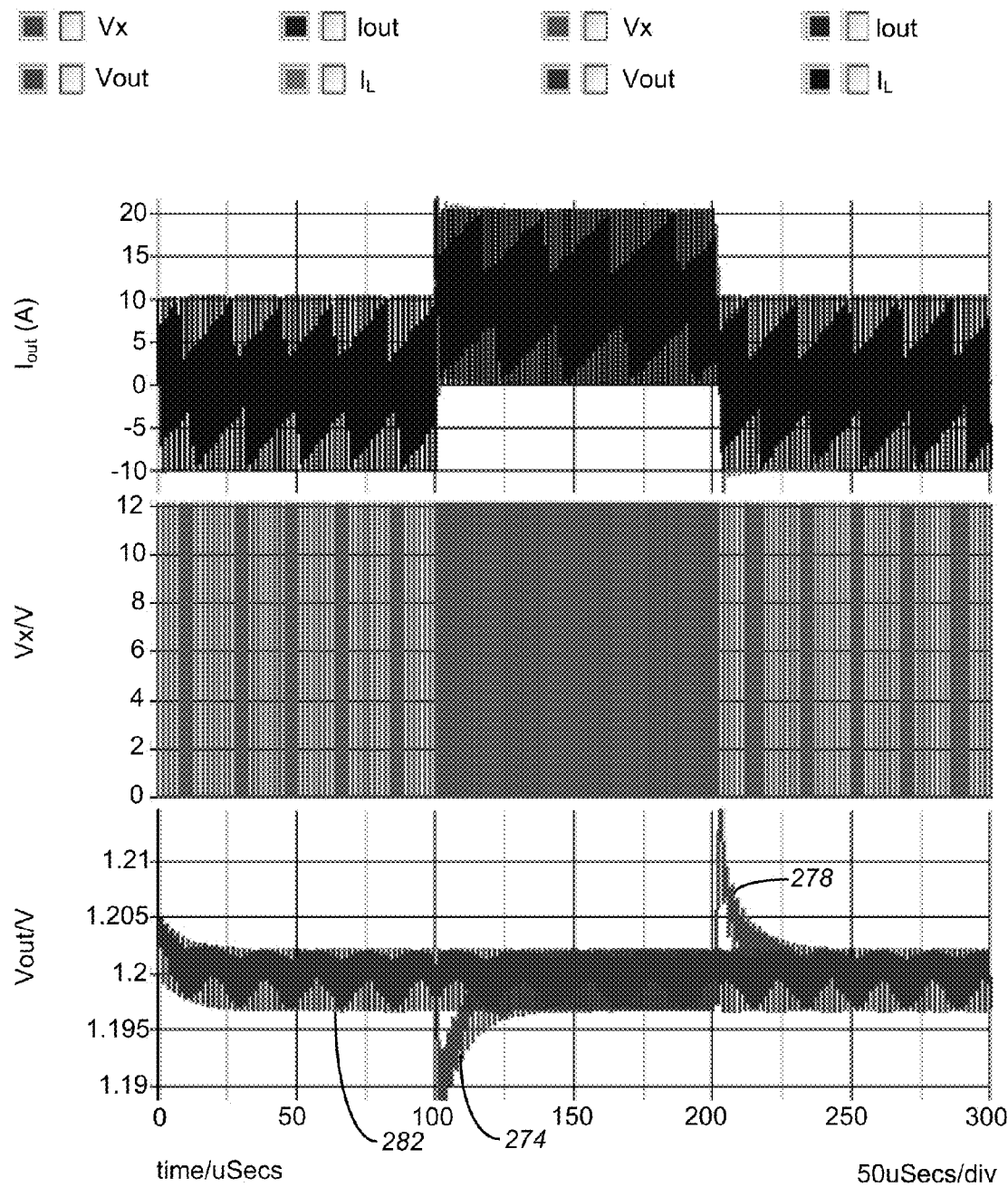
FIGS. 2B-2E show timing diagrams of examples of waveform geometries of voltages and currents of various voltage regulators as described herein.

FIG. 2B shows a view of waveforms representing $I_L$, Iout, the voltage at node Vx, and Vout. In FIG. 2B, $I_L$ is bounded between upper and lower limits in a range of about 20 amps and has a DC component, which steps from 0 amps up to 10 amps at about 100 microseconds and back down to 0 amps at about 200 microseconds in response to a corresponding change in Iout. Without transient minimizer circuitry, Vout includes transient component 274 representing undershoot and transient component 278 representing overshoot, corresponding to the feedback loop response and associated delay described above with respect to FIGS. 1A and 1B. In another example, when transient minimizer circuitry is included, transient components 274 and 278 are eliminated or substantially minimized, and Vout is almost completely flat, as shown by the shape of waveform 282.

Figure 2C:
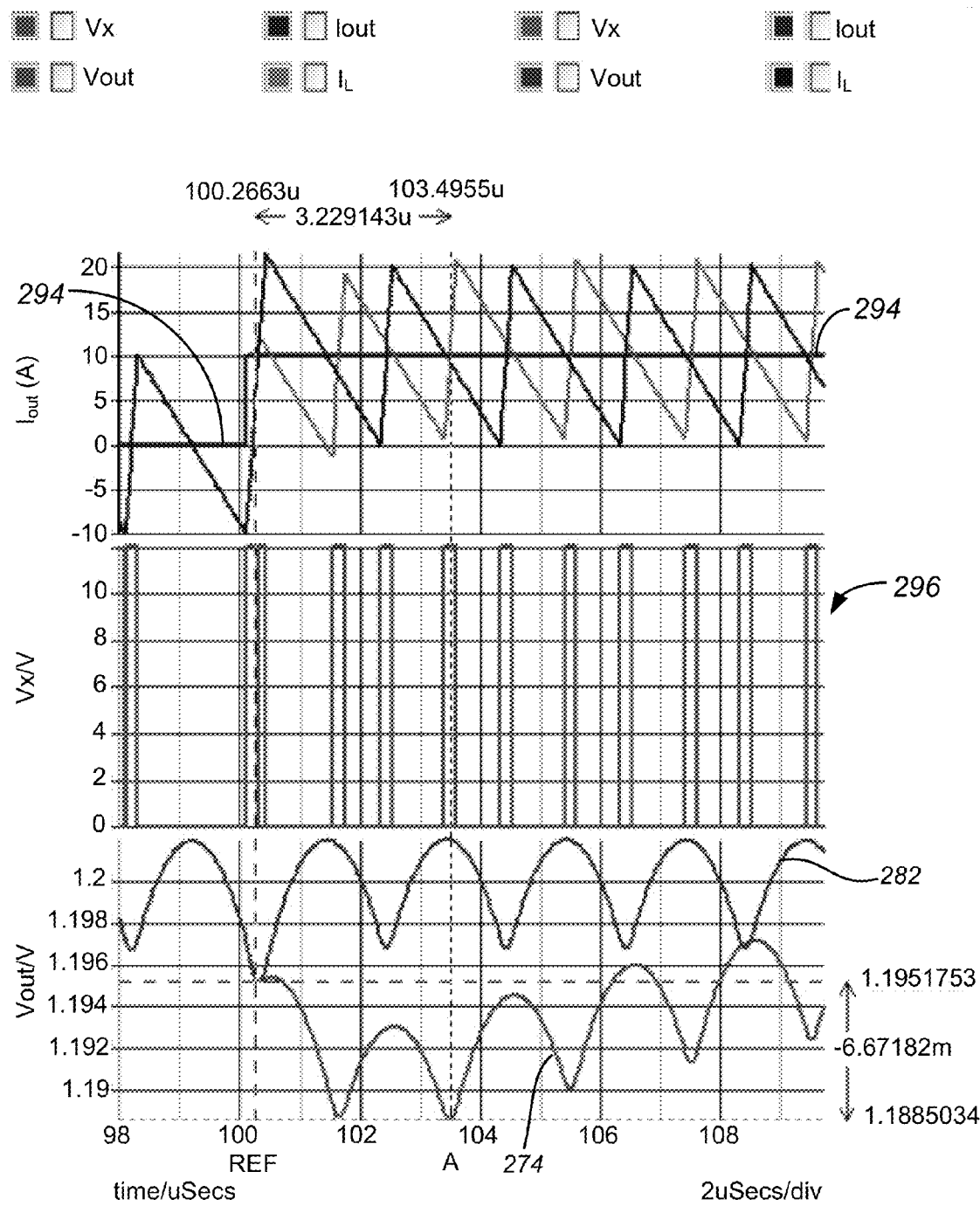

FIG. 2C shows a zoomed-in view of a portion of the waveforms of FIG. 2B, with Iout 294 stepping from 0 amps to 10 amps at 100 microseconds. The voltage 296 monitored at node Vx is in the form of a pulse train having rising and falling edges indicating switching events, as described above. A portion of the undershoot of transient component 274 between 100 microseconds and about 110 microseconds is illustrated, that is, when transient minimizer circuitry is not included. As with FIG. 2B, waveform 282 has a substantially consistent range of voltage values due to the inclusion of transient minimizer circuitry to minimize or eliminate undershoot.

Figure 2D:
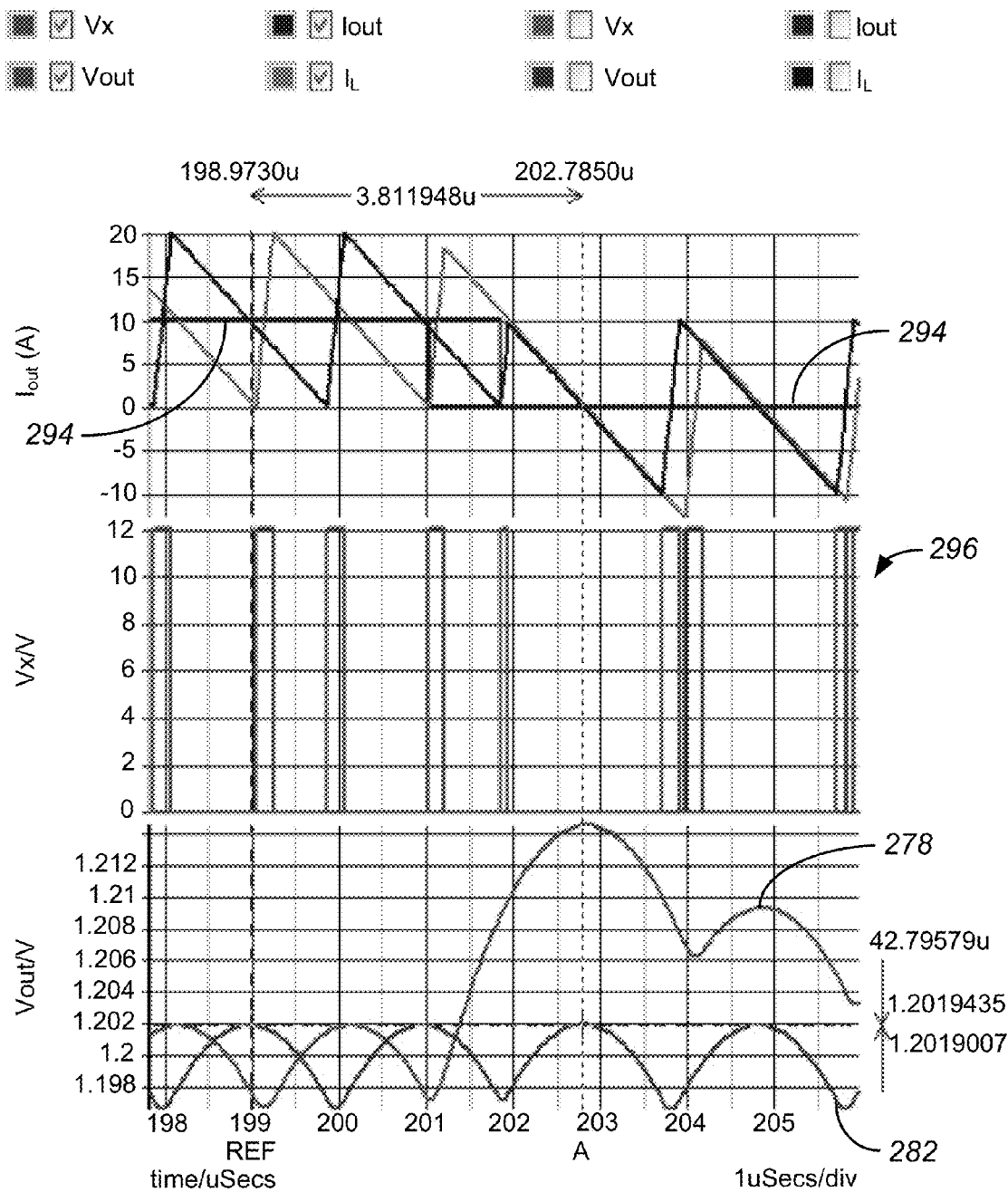

FIG. 2D shows a zoomed-in view of a portion of the waveforms of FIG. 2B, with Iout 294 stepping from 10 amps to 0 amps at about 202 microseconds. A portion of the overshoot of transient component 278 between 201 microseconds and about 206 microseconds is illustrated, that is, when transient minimizer circuitry is not included. As in FIGS. 2A and 2B, when transient minimizer circuitry is included, waveform 282 has a substantially consistent range of voltage values, that is, with minimal or no overshoot.

Figure 2E:
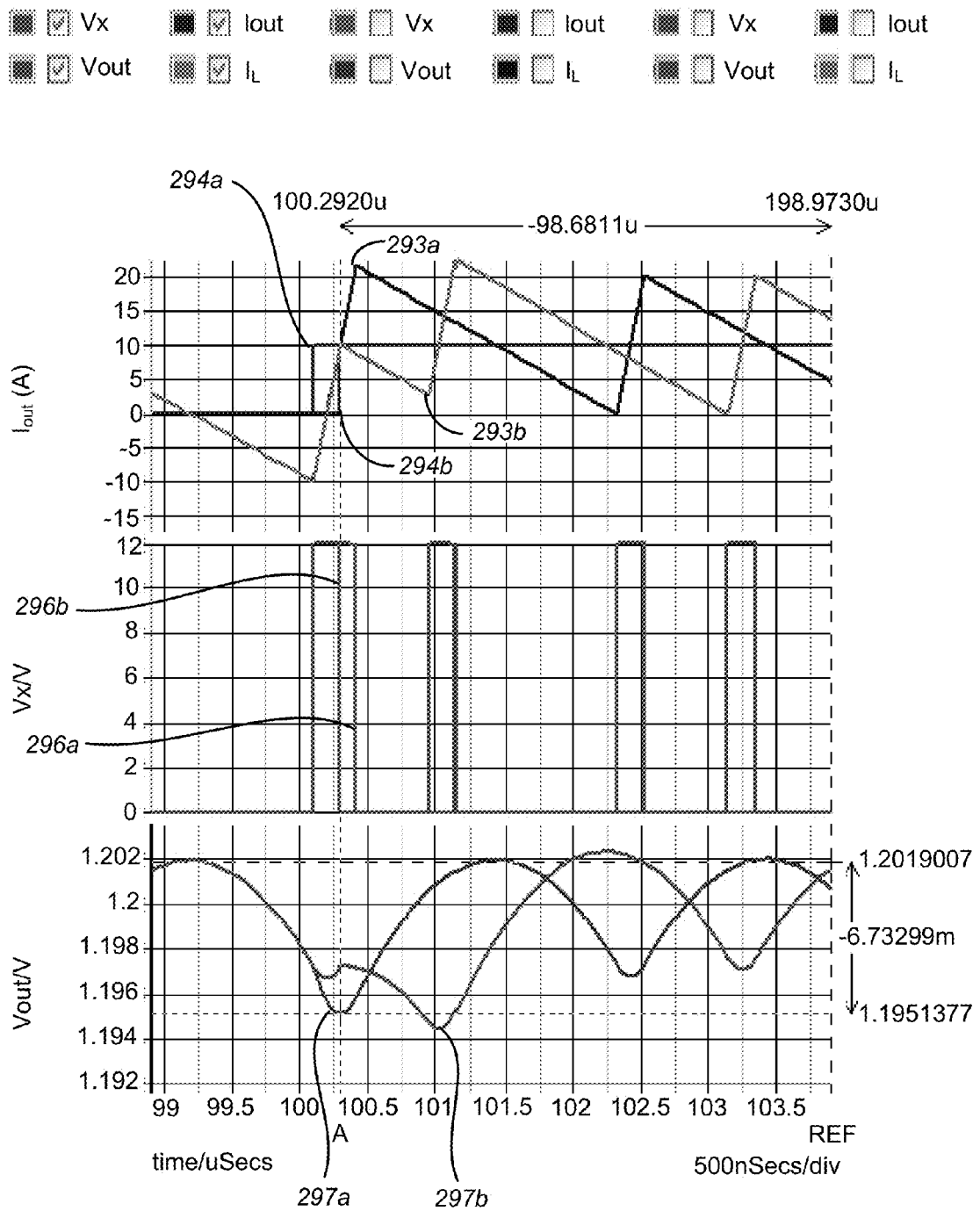

FIG. 2E shows a view of waveforms comparing synchronization of the load transient with either the Vx rising or falling edge, when transient minimizer circuitry is included. The waveforms for rising edge synchronization are: Iout 294a, voltage 296a at node Vx, $I_L$ 293a, and Vout 297a. The waveforms for falling edge synchronization are: Iout 294b, voltage 296b at node Vx, $I_L$ 293b, and Vout 297b. Here, since the load is stepped upward, it would be desirable to synchronize load transients to the time when Iout is at maximum level; however, this occurs at the falling edge of the Vx pulse train 296b that is too late since, after that, $I_L$ 293b starts to move in the opposite direction of the step in Iout 294b; thus, Vout 297b drops more than Vout 297a. Hence, if the change in Iout is eminent while Vx is high, the transient minimizer circuitry can send a load trigger signal 230 back to the load during the time Vx is high, allowing the load transient to occur, after which the Vx pulse train drops. In some examples, synchronizing to the falling edge could reduce transients when handshaking is used, i.e., when sending load trigger signals back to the load. In other examples, synchronizing to rising edges of the Vx pulse train provides reasonable results and is simpler to implement.

In FIGS. 2B-2E, when undershoot is too high, there can be a risk of a load such as an ASIC generating logic errors or, when the load is a microprocessor, there is a risk of lock-up. When overshoot is too high, there are risks of degrading long-term system reliability and damaging system components, particularly with lower voltage/finer process geometries.

Figure 3A:
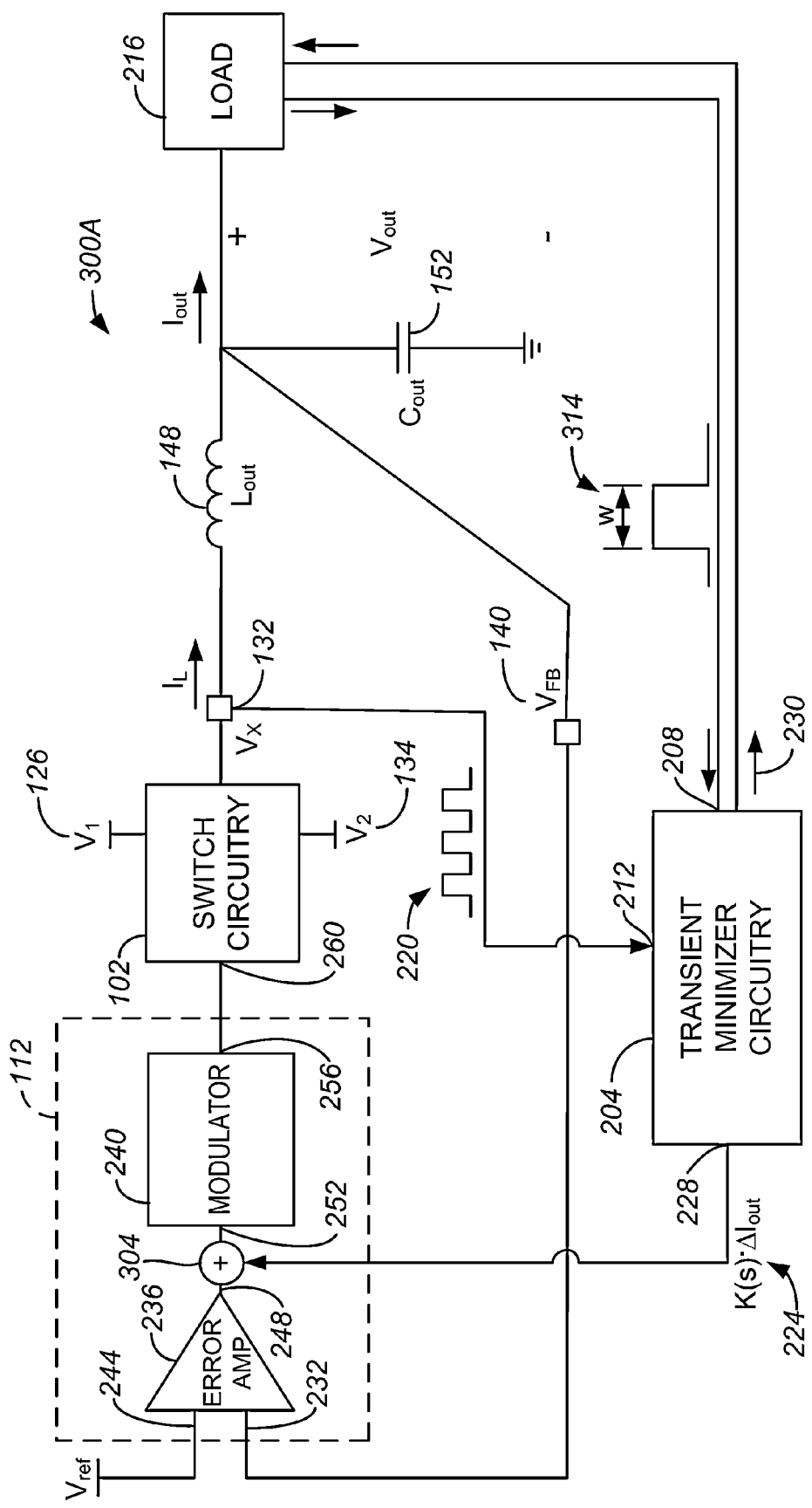
FIG. 3A is a simplified diagram of an example of components of a voltage regulator 300A including transient minimizer circuitry, according to some implementations.

FIG. 3A is a simplified diagram of an example of components of a voltage regulator 300A including transient minimizer circuitry, according to some implementations. The components of FIG. 3A are configured similar to FIG. 2A, as described above, except that output 228 of transient minimizer circuitry 204 is coupled to a summing node 304 coupled between output 248 of error amplifier 236 and input 252 of modulator 240, instead of being coupled to summing node 246. That is, in FIG. 3A, summing node 304 replaces summing node 246 of FIG. 2A, so input 232 of error amplifier 236 receives $V_{FB}$, and input 252 of modulator 240 is coupled to receive the error signal in combination with the state command signal. Also, in the example of FIG. 3A, a current change notification signal 314 is in the form of a pulse, with a pulse width, w, conveying pertinent information. For instance, w can indicate a magnitude of the impending change in Iout or a specific amount of delay before the impending change in Iout will occur. In the examples of FIGS. 2A and 3A, the delay information can be used by transient minimizer circuitry 204 to generate state command signal 224, for instance, synchronized with a rising or falling edge of a pulse train indicating switching frequency and switching events, and load trigger signal 230 delayed by delay w with respect to signal 224, as described above.

Figure 3B:
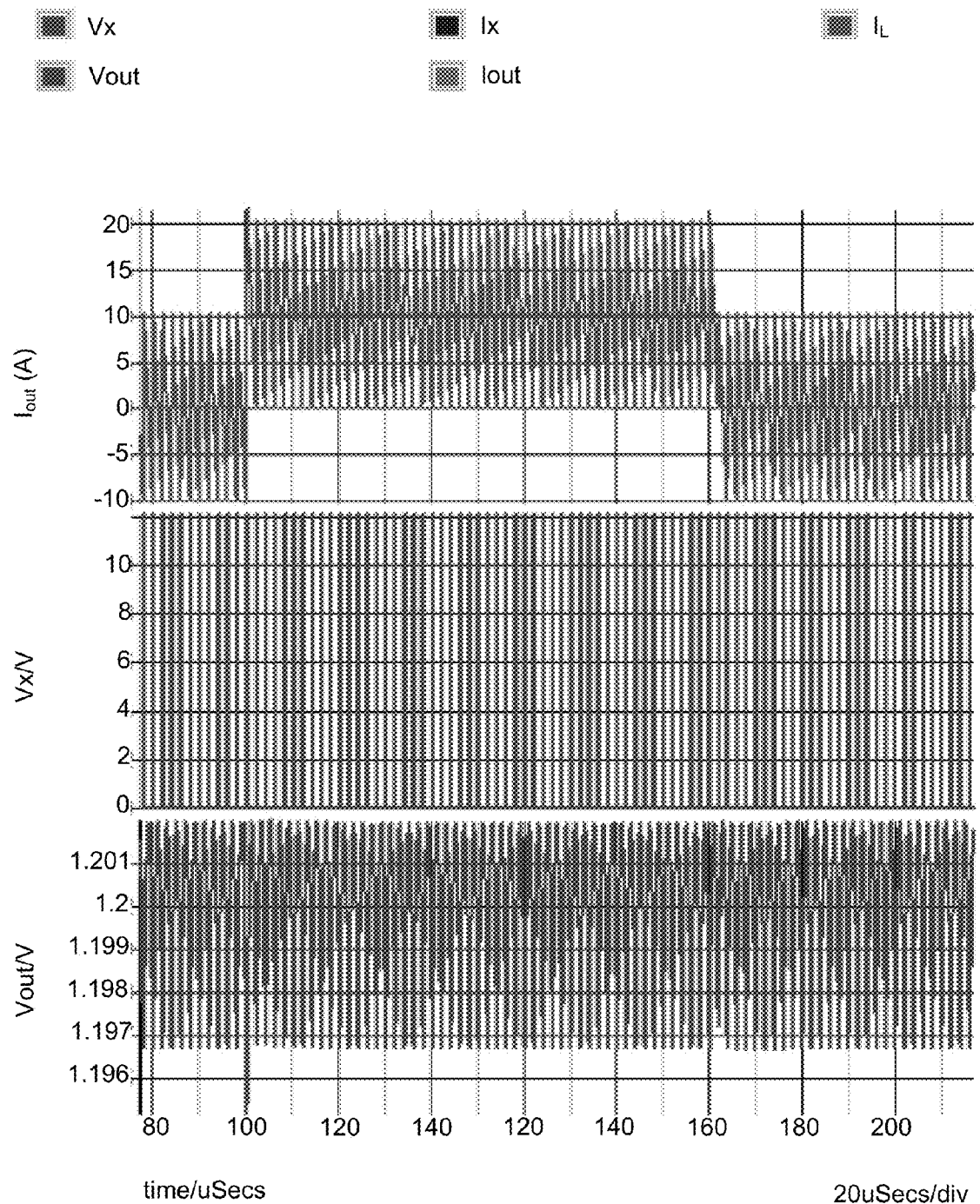
FIG. 3B shows a timing diagram of examples of waveform geometries of voltages and currents of voltage regulator 300A.

FIG. 3B shows a timing diagram of examples of waveform geometries of voltages and currents of voltage regulator 300A. In FIG. 3B, minimization or elimination of transients can be observed in Vout, in a simulation in which the configuration of FIG. 3A is implemented.

Figure 4A:
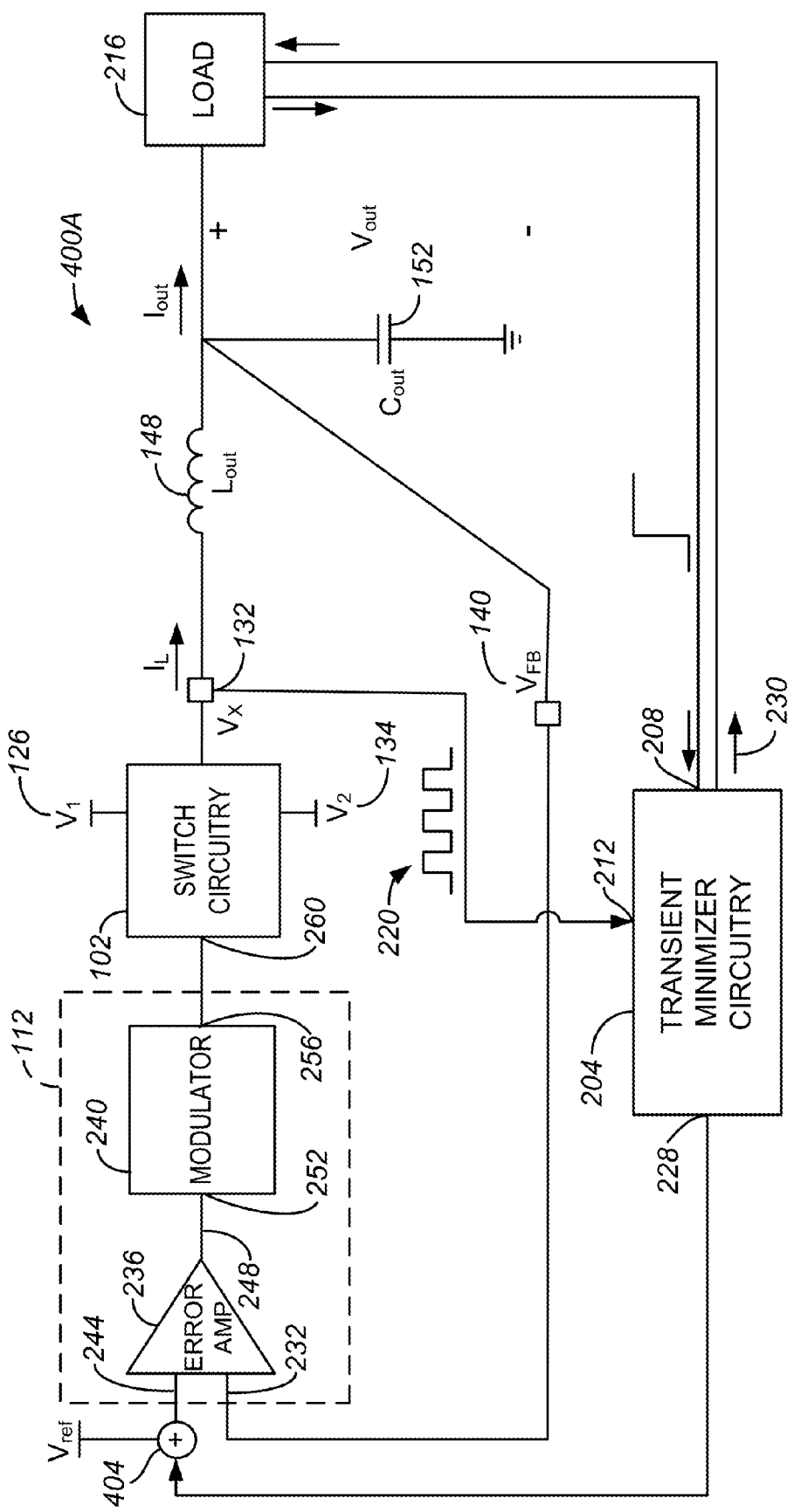
FIG. 4A is a simplified diagram of an example of components of a voltage regulator 400A including transient minimizer circuitry, according to some implementations.

In other implementations, state command signal 224 can be coupled to Vref input 244 of switching control circuitry 112. FIG. 4A is a simplified diagram of an example of components of a voltage regulator 400A including transient minimizer circuitry, according to some implementations. The components of FIG. 4A are configured similar to FIG. 2A, as described above, except that output 228 of transient minimizer circuitry 204 is coupled to a summing node 404 coupled between Vref and input 244 of error amplifier 236, instead of being coupled to summing node 246. That is, in FIG. 4A, summing node 404 replaces summing node 246 of FIG. 2A, so input 232 of error amplifier 236 receives $V_{FB}$, and input 244 of error amplifier 236 is coupled to receive Vref in combination with the state command signal.

Figure 4B:
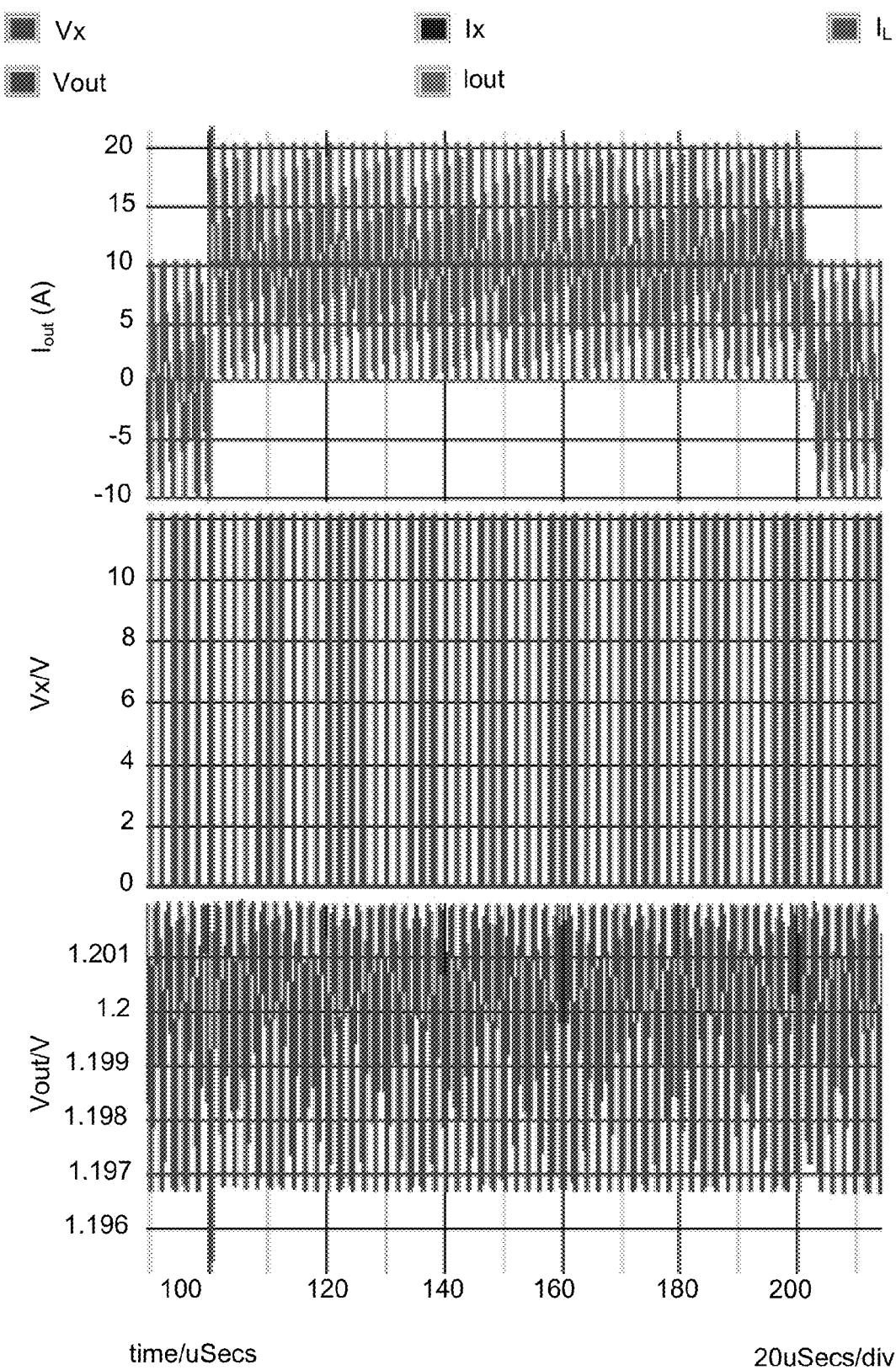
FIG. 4B shows a timing diagram of examples of waveform geometries of voltages and currents of voltage regulator 400A.

FIG. 4B shows a timing diagram of examples of waveform geometries of voltages and currents of voltage regulator 400A. In FIG. 4B, minimization or elimination of transients can be observed in Vout, in a simulation in which the configuration of FIG. 4A is implemented.

Figure 5:
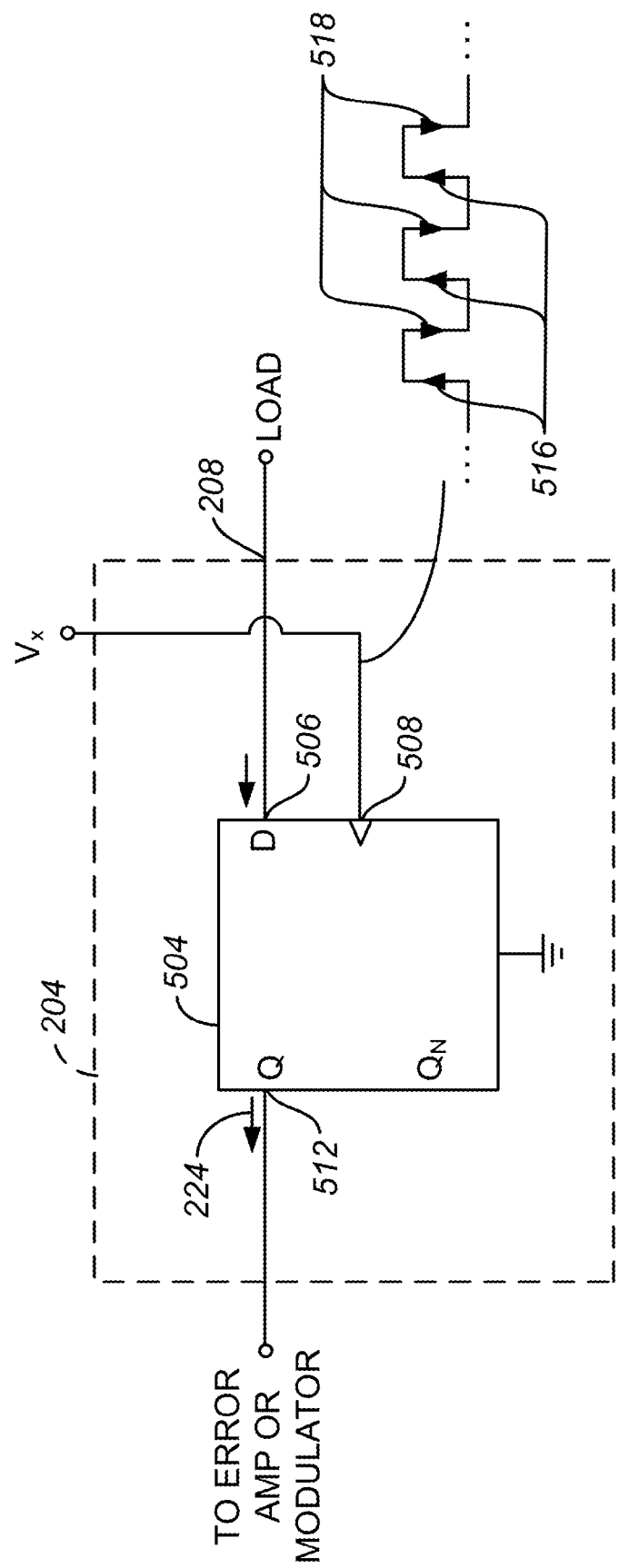
FIG. 5 is a simplified diagram of an example of components of synchronizer circuitry incorporated into some implementations of transient minimizer circuitry as described herein.

The transient minimizer circuitry described herein can be implemented to include analog circuitry, digital circuitry, and/or combinations thereof, depending on the desired implementation. FIG. 5 is a simplified diagram of an example of components of synchronizer circuitry incorporated into one or more implementations of transient minimizer circuitry as described above with reference to FIGS. 2A, 3A, and 4A. In FIG. 5, one example of such synchronizer circuitry includes a flip-flop circuit 504. In this example, flip-flop circuit 504 is configured as a D flip-flop with a data or "D" input 506 coupled to receive current change notification signal 214 from load 216 and with a clock input 508 coupled to node Vx to sense switching frequency and switching events. Thus, in some implementations, flip-flop circuit 504 can synchronize current change notification signal 214 with rising edges 516 or falling edges 518 of switching frequency and switching event signal 220, illustrated here as a pulse train, to generate state command signal 224 at a Q output 512 for delivery to switching control circuitry in any of the various implementations described herein. An alternative example of synchronizer circuitry, rather than flip-flop circuit 504, includes a phase locked loop configured to lock onto an edge of switching frequency and switching event signal 220.

Figure 6A:
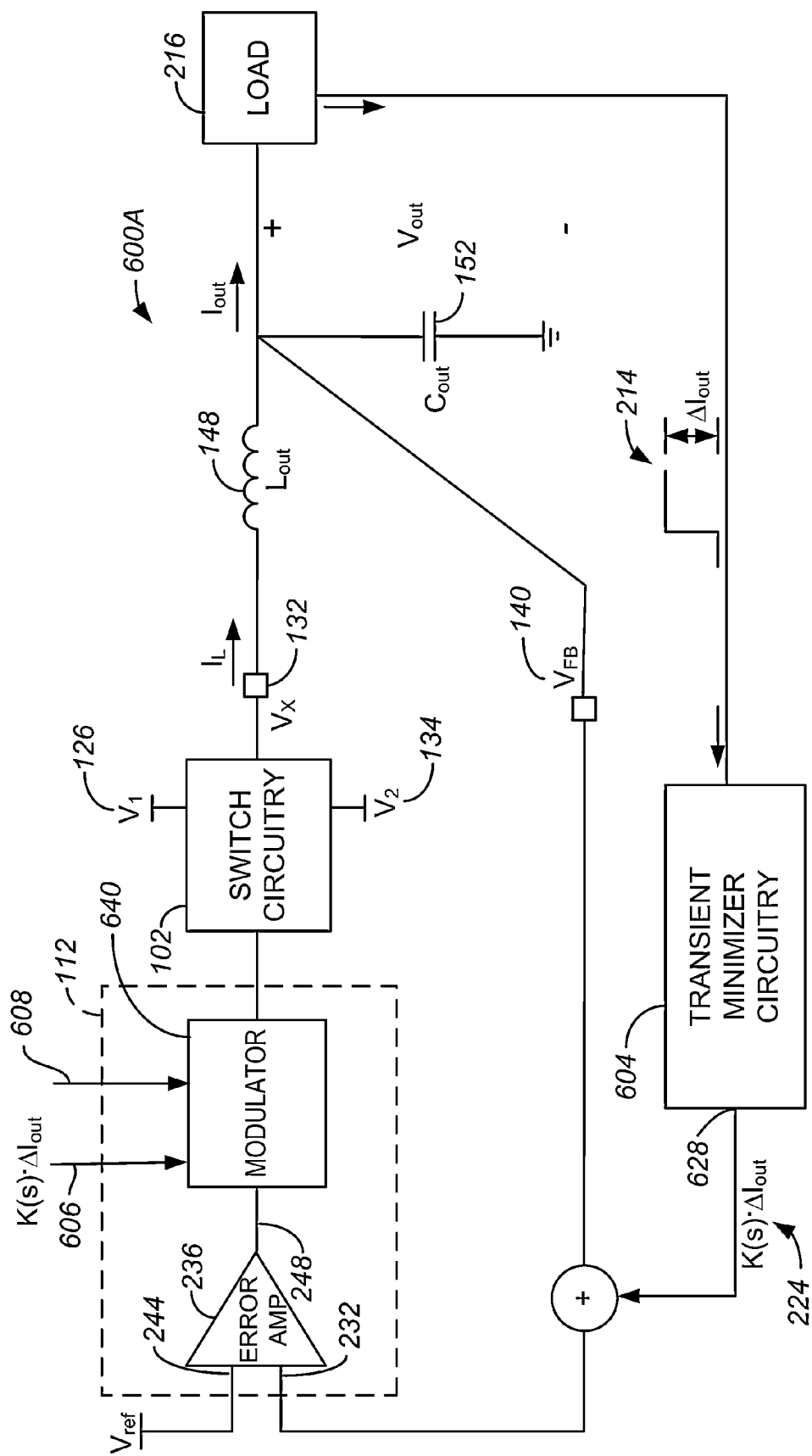
FIG. 6A is a simplified diagram of an example of components of a voltage regulator 600A including another configuration of transient minimizer circuitry and of a modulator, according to some implementations.

In some implementations, a modulator of switching control circuitry 112 as generally described above can have additional inputs. FIG. 6A is a simplified diagram of an example of components of a voltage regulator 600A including an alternative configuration of transient minimizer circuitry and of a modulator, according to some other implementations. Voltage regulator 600A includes some of the same components and, in some respects, is configured in similar fashion as the voltage regulators of FIGS. 2A, 3A, and 4A, with like reference numerals indicating like parts. One of the differences of regulator 600A with respect to the regulators described above is that a modulator 640 replaces modulator 240, and modulator 640 has a current sense input 606 and a ramp compensation input 608. In such configurations, state command signal 224 can be injected directly into either of inputs 606 or 608 of modulator 640 or other appropriately configured modulator inputs to cause modulator 640 to operate switch circuitry 102 in a manner to produce the new desired state of Iout of voltage regulator 600A.

Another difference between voltage regulator 600A and the regulators described above is that transient minimizer circuitry 604 does not include a switching frequency and switching event input 212, nor does regulator 600A monitor for switching frequency and switching events at switch circuitry 102. Thus, in the example of FIG. 6A, the generation and output of state command signal 224 at output 628 of transient minimizer circuitry 604 is independent of and asynchronous with respect to switching frequency and switching events of switch circuitry 102.

In FIG. 6A, another difference is that transient minimizer circuitry 604 does not include a load trigger output to convey information such as a load trigger signal 230 back to load 216, nor does transient minimizer circuitry 604 include circuitry configured to generate such a load trigger signal 230, in this example. In FIG. 6A, there is one-way communication between load 216 and transient minimizer circuitry 604, in that load 216 provides load current change notification signal 214 to transient minimizer circuitry 604, as generally described above, indicating that a load change is about to occur. The load change can coincide with signal 214 or have an appropriate skew (delay) to signal 214. The transient minimizer circuitry 604 will generate state command signal 224 with an appropriate timing relationship to signal 214 based on the load change skew with respect to signal 214. The magnitude of state command signal 224 can be generated based on: load change magnitude, $\Delta$Iout, communicated by signal 214, a specified amount when the load step is known, or other user-programmed formulas when load change magnitude is not known and not communicated by signal 214.

In examples such as the configuration of FIG. 6A, the internal components of transient minimizer circuitry 604 described above with reference to FIG. 5 can be modified to include no synchronizer circuitry. For instance, transient minimizer circuitry 604 can incorporate a D latch rather than the D flip-flop configuration of FIG. 5, since clock input 508 of FIG. 5 can be omitted.

Figure 6B:
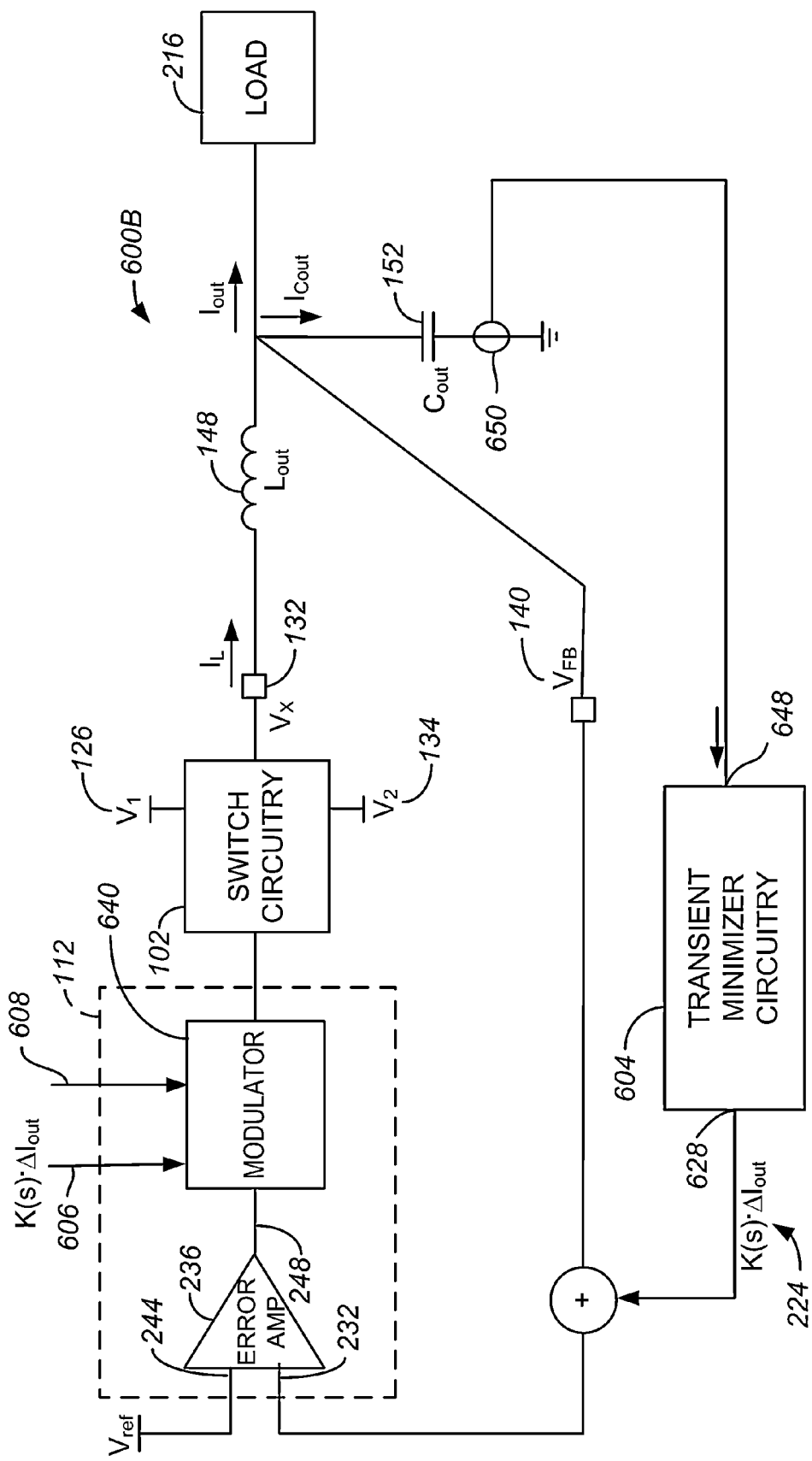
FIG. 6B is a simplified diagram of an example of components of a voltage regulator 600B including another configuration of transient minimizer circuitry, according to some implementations.

FIG. 6B is a simplified diagram of an example of components of a voltage regulator 600B including another configuration of transient minimizer circuitry, according to some implementations. FIG. 6B is similar to FIG. 6A in most respects. However, in the example of voltage regulator 600B, load current change events are communicated to a current notification input 648 of transient minimizer circuitry 604 indirectly and inferentially from load 216 by sensing a current, $I_{Cout}$, in output capacitor 152. In the example of FIG. 6B, this sensing is achieved using a current sensor 650 coupled between capacitor 152 and ground. That is, in FIG. 6B, Iout can be monitored by sensing $I_{Cout}$, which is indicative of Iout and conveys load change information to input 648 of transient minimizer circuitry 604.

Figure 6C:
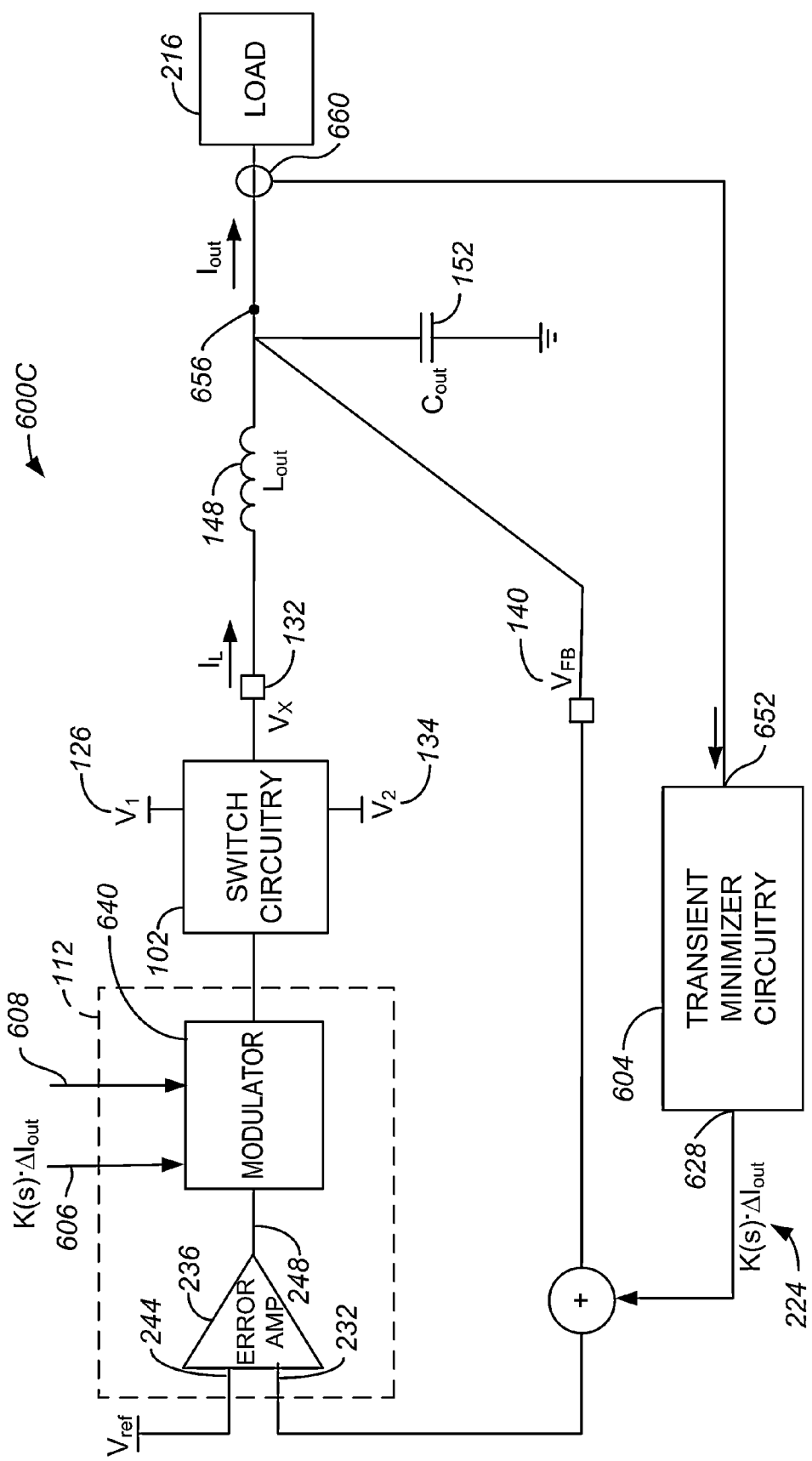
FIG. 6C is a simplified diagram of an example of components of a voltage regulator 600C including yet another configuration of transient minimizer circuitry, according to some implementations.

FIG. 6C is a simplified diagram of an example of components of a voltage regulator 600C including another configuration of transient minimizer circuitry, according to some implementations. FIG. 6C is similar to FIGS. 6A and 6B in most respects. In the example of voltage regulator 600C, as with the example of voltage regulator 600B, load current change events are communicated to transient minimizer circuitry 604 indirectly from load 216. In FIG. 6C, rather than monitoring a current across output capacitor 152, a current notification input 652 is coupled to a node 656 between output capacitor 152 and load 216 to sense Iout, which can indicate that a change in an electrical characteristic of the load has occurred, i.e., when Iout rises or falls in this example. In FIG. 6C, a current sensor 660 can be coupled at node 656 to sense Iout and provide this information to input 652 of circuitry 604. In other implementations, Iout can be monitored by measuring a voltage drop across package pins of a package in which the load is fabricated, for example, in the case of a socketed load. That is, Iout can be inferred by dividing this measured voltage drop by the known or approximate resistance values of the package pins. In another configuration, a Hall effect sensor or other magnetically coupled sensor can be used to measure Iout. Likewise, Iout can be measured by measuring a voltage drop in the power or ground trace coupling the output of the regulator and the ground of the regulator to the load, respectively.

In FIGS. 6B and 6C, Iout can indicate that a change at the load has occurred and can be monitored in various ways as should be appreciated by those skilled in the art. Returning to the example of FIG. 6B, in an alternative configuration, current sensor 650 is replaced with a resistor having a designated resistance coupled between output capacitor 152 and ground, and a voltage drop measured across the resistor is indicative of $I_{Cout}$. By the same token, the resistance of a trace coupling capacitor 152 between the output of inductor 148 and ground can be used to infer $I_{Cout}$.

Figure 7:
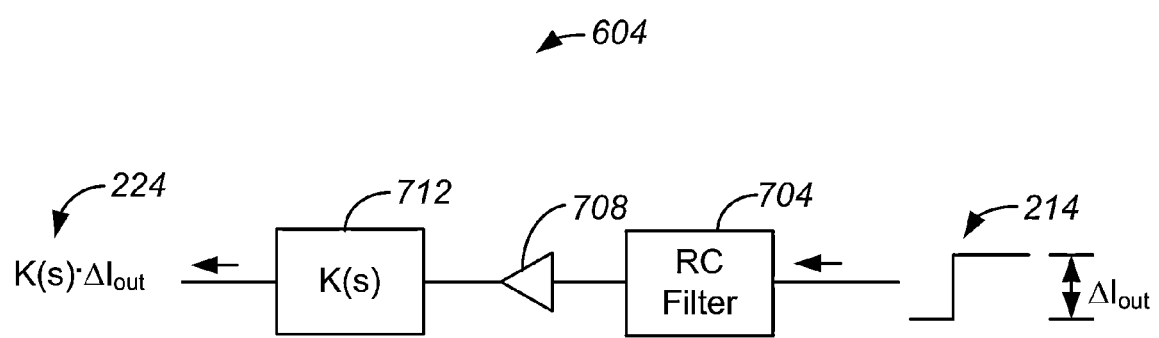
FIG. 7 is a simplified diagram of an example of a configuration of components in some implementations of transient minimizer circuitry as described herein.

In situations when the load change is skewed with respect to current change notification signal 214, transient minimizer circuitry 604 can have an alternative configuration, as shown in the illustration of FIG. 7. In this example, transient minimizer circuitry 604 includes a resistor-capacitor (RC) filter 704 coupled to receive current change notification signal 214, with the output of the RC filter coupled to a logic gate such as a buffer 708, the output of which is coupled to scaling and signal conditioning circuitry 712 to apply a K(s) function as described above to provide appropriate scaling and conditioning of state command signal 224. In this example, the RC filter 704 and logic gate 708 combination can replace the D flip-flop or D latch configurations described above. The RC filter 704 will be tuned based on the skew of the load change with respect to signal 214. This skew is inserted to allow time for processing of signal 214, generation of signal 224 and propagation of the effect of signal 224 through drivers and switching circuits. In other situations where current change notification signal 214 coincides with a load change event, RC filter 704 can be omitted from the signal path.

Figure 8:
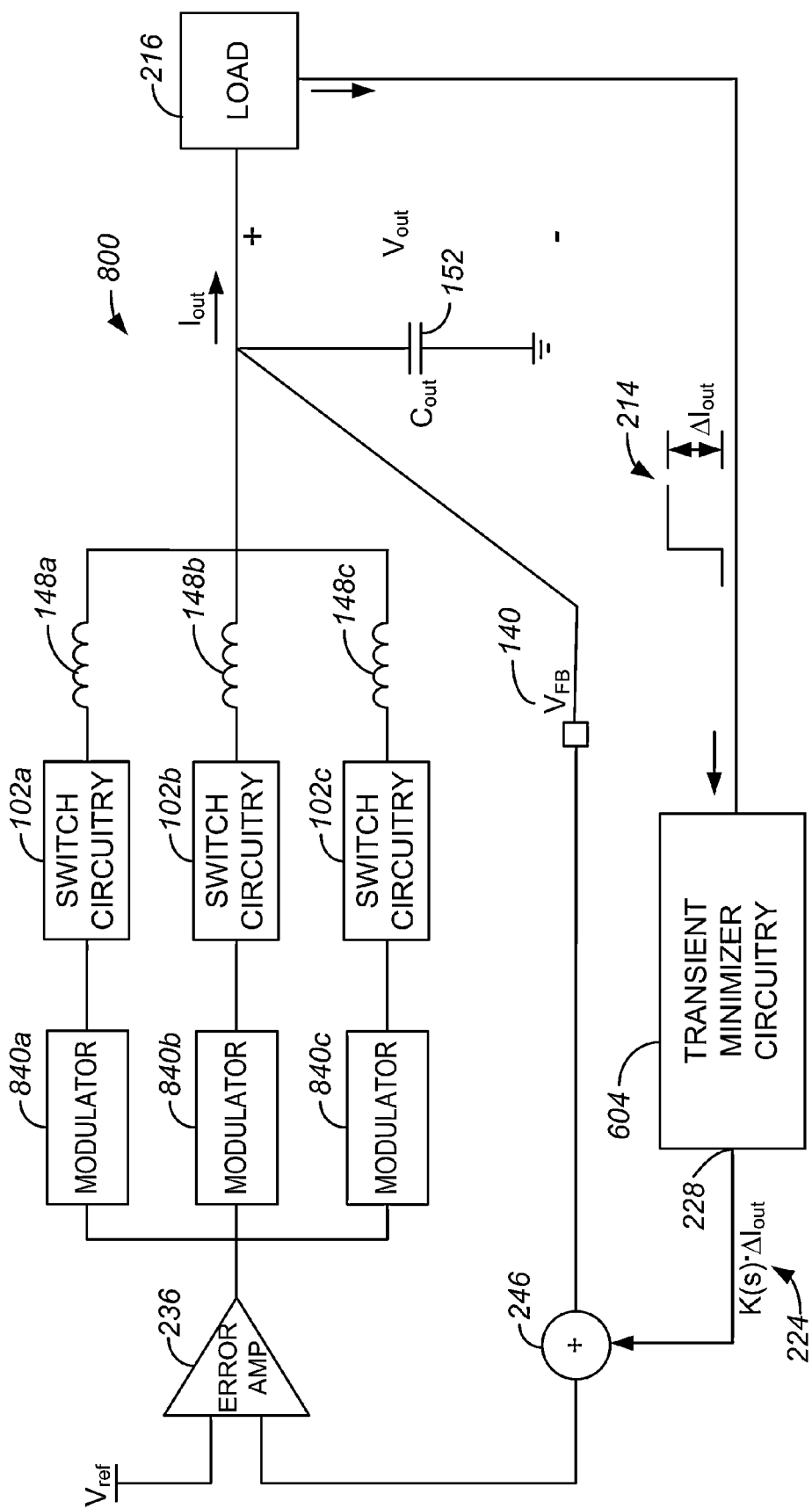
FIG. 8 is a simplified diagram of an example of components of a multi-phase voltage regulator 800 including transient minimizer circuitry, according to some implementations.

The various examples of transient minimizer circuitry described above can be implemented in multi-phase voltage regulators in addition to single phase voltage regulators. FIG. 8 is a simplified diagram of an example of components of a multi-phase voltage regulator 800 including transient minimizer circuitry, according to some implementations. Voltage regulator 800 includes some of the same components and, in some respects, is configured in similar fashion as the voltage regulators of FIGS. 2A and 6A, with like reference numerals indicating like parts. As illustrated, multi-phase regulator 800 includes several parallel paths of modulators, switch circuitries, and output inductors, where each path represents one of the phases. In particular, output 248 of error amplifier 236 is coupled to respective inputs of modulators 840a, 840b, and 840c. Respective outputs of modulators 840a, 840b, and 840c are coupled to respective inputs of switch circuitries 102a, 102b, and 102c, respective outputs of which are coupled to respective inductors 148a, 148b, and 148c. The three parallel paths of modulators 840a, 840b, and 840c illustrated in FIG. 8 can be extended to include any number of such paths, as desired for the particular implementation.

In FIG. 8, state command signal 224 is provided to an input of error amplifier 236, as described above with reference to FIGS. 2A and 4A. In other implementations, state command signal 224 is injected into any of various inputs of respective modulators 840a, 840b, and 840c as described above with reference to FIGS. 3A and 6A. The inductors 148a, 148b, and 148c can be discrete or magnetically coupled for the multiple phases, depending on the desired implementation. At a minimum, N phases of a multi-phase regulator can be magnetically coupled in pairs or, at a maximum, all magnetically coupled together. Those skilled in the art should appreciate that the disclosed techniques are applicable to all other phase coupling strategies.

Depending on the desired implementation, different devices, apparatus, circuitry, components, mechanisms, modules, and units as described herein can be fabricated so that they share the same substrate, e.g., are on the same die or chip. In an alternative implementation, such devices, apparatus, circuits, components, mechanisms, modules, and/or units can be fabricated on different substrates, e.g., on different chips. In either implementation, such devices, apparatus, circuits, components, mechanisms, modules, and/or units can be provided in the same or different packages. For instance, transient minimizer circuitry 204 or 604 can be fabricated on a first die and interconnected with switching control circuitry 112 fabricated on a different second die, interconnected with one another as described above, and provided in the same package. In another example, the transient minimizer circuitry 204 or 604 could be fabricated in a discrete component separate from other components, such as circuitry 112 and 102 of the voltage regulators described above.

While the disclosed subject matter has been particularly shown and described with reference to specific implementations thereof, it will be understood by those skilled in the art that changes in the form and details of the disclosed implementations may be made without departing from the spirit or scope of the disclosure. The present disclosure should, of course, not be limited to the depicted implementations. In addition, although various advantages and aspects of the disclosed subject matter have been discussed herein with reference to various implementations, it will be understood that the scope of the disclosure should not be limited by reference to such advantages and aspects. Rather, the scope of the disclosure should be determined with reference to the appended claims.

What is claimed is:

1. Circuitry for controlling a voltage regulator responsive to information from a load, the circuitry comprising:
   transient minimizer circuitry having a first input, a second input, a first output, and a second output coupled to an input of the load, the first input coupled to receive a notification signal indicating a change or an anticipated change in an electrical characteristic of the load, the second input coupled to receive a switching signal indicating a switching frequency and/or a switching event of the voltage regulator, the transient minimizer circuitry configured to generate:
      a state command signal at the first output responsive to the notification signal, the state command signal synchronized with the switching signal, the state command signal indicating a state of the voltage regulator, and
      a load trigger signal at the second output, the load trigger signal synchronized with the switching signal; and
   switching control circuitry coupled to the first output of the transient minimizer circuitry to receive the state command signal from the transient minimizer circuitry, the switching control circuitry configured to operate switch circuitry to control the state of the voltage regulator in accordance with the state command signal.

2. The circuitry of claim 1, wherein the notification signal indicates an anticipated change in current to be drawn by the load from the voltage regulator.

3. The circuitry of claim 2, wherein the notification signal and the state command signal indicate a timing of the anticipated change in current.

4. The circuitry of claim 3, wherein the notification signal has a pulse width indicating a delay associated with the anticipated change in current.

5. The circuitry of claim 2, wherein the notification signal and the state command signal indicate an amount of the anticipated change in current.

6. The circuitry of claim 2, wherein the notification signal indicates both of: an amount of the anticipated change in current, and a timing of the anticipated change in current.

7. The circuitry of claim 1, wherein the generation of the state command signal is offset with respect to the generation of the load trigger signal.

8. The circuitry of claim 1, wherein the load trigger signal instructs the load to initiate the anticipated change in the electrical characteristic.

9. The circuitry of claim 1, wherein the second input of the transient minimizer circuitry is coupled to one of: an output of the switch circuitry, a component of the switch circuitry, and a driver of the switch circuitry.

10. The circuitry of claim 1, wherein the switching signal has a rising edge and a falling edge, each edge indicating a respective switching event of the voltage regulator.

11. The circuitry of claim 1, wherein the transient minimizer circuitry includes a flip-flop circuit having: a data input coupled to receive the notification signal and a clock input coupled to receive the switching signal.

12. The circuitry of claim 1, wherein the transient minimizer circuitry includes a phase locked loop.

13. The circuitry of claim 1, wherein the transient minimizer circuitry is configured to generate the state command signal based on a transfer function associated with the switching control circuitry.

14. The circuitry of claim 1, wherein an output current is the state of the voltage regulator.

15. The circuitry of claim 1, wherein the switching control circuitry includes:
an error amplifier having one or more inputs coupled to sense a feedback voltage, the feedback voltage indicating an output voltage of the voltage regulator, the error amplifier configured to compare the feedback voltage with a reference voltage to generate an error signal at an output of the error amplifier; and
a modulator having an input coupled to receive a current command signal including the error signal, the modulator configured to generate a control signal to operate the switch circuitry responsive to the current command signal.

16. The circuitry of claim 15, wherein an input of the error amplifier is coupled to sense the feedback voltage in combination with the state command signal.

17. The circuitry of claim 15, wherein an input of the error amplifier is coupled to receive the reference voltage in combination with the state command signal.

18. The circuitry of claim 1, wherein the switching control circuitry determines the state of the switch circuitry according to a control scheme being one of: hysteretic voltage control, hysteretic current control, current mode control, peak current mode control, valley current mode control, constant on-time control, constant off-time control, average current mode control, and voltage mode control.

19. The circuitry of claim 1, wherein the electrical characteristic of the load is a current drawn by the load from the voltage regulator.

20. A voltage regulator comprising:
an output filter coupled to a load;
switch circuitry coupled to the output filter and to the load;
transient minimizer circuitry having a first input, a second input, a first output, and a second output coupled to an input of the load, the first input coupled to receive a notification signal indicating a change or an anticipated change in an electrical characteristic of the load, the second input coupled to receive a switching signal indicating a switching frequency and/or a switching event of the voltage regulator, the transient minimizer circuitry configured to generate:
a state command signal at the first output responsive to the notification signal, the state command signal synchronized with the switching signal, the state command signal indicating a state of the voltage regulator, and
a load trigger signal at the second output, the load trigger signal synchronized with the switching signal; and
switching control circuitry coupled to the first output of the transient minimizer circuitry to receive the state command signal from the transient minimizer circuitry, the switching control circuitry configured to operate the switch circuitry to control the state of the voltage regulator in accordance with the state command signal.

21. A system comprising:
a voltage regulator including switch circuitry;
a load coupled to the switch circuitry of the voltage regulator;
transient minimizer circuitry having a first input, a second input, a first output, and a second output coupled to an input of the load, the first input coupled to receive a notification signal indicating a change or an anticipated change in an electrical characteristic of the load, the second input coupled to receive a switching signal indicating a switching frequency and/or a switching event of the voltage regulator, the transient minimizer circuitry configured to generate:
a state command signal at the first output responsive to the notification signal, the state command signal synchronized with the switching signal, the state command signal indicating a state of the voltage regulator, and
a load trigger signal at the second output, the load trigger signal synchronized with the switching signal; and
switching control circuitry coupled to the first output of the transient minimizer circuitry to receive the state command signal from the transient minimizer circuitry, the switching control circuitry configured to operate the switch circuitry to control the state of the voltage regulator in accordance with the state command signal.

22. A voltage regulator control process comprising:
receiving at a first input a notification signal indicating a change or an anticipated change in an electrical characteristic of a load;
receiving at a second input a switching signal indicating a switching frequency and/or a switching event of the voltage regulator;
generating a state command signal responsive to the notification signal, the state command signal synchronized with the switching signal, the state command signal indicating a state of the voltage regulator;
generating a load trigger signal synchronized with the switching signal;
providing the state command signal at a first output to operate switch circuitry to control the state of the voltage regulator in accordance with the state command signal; and
providing the load trigger signal at a second output coupled to an input of the load.

23. The circuitry of claim 1, wherein the notification signal indicates a monitored change in current drawn by the load from the voltage regulator.

24. The circuitry of claim 23, wherein the state command signal is conditioned to indicate an amount of the monitored change in current.

25. The circuitry of claim 23, further comprising:
a current sensor coupled between the load and a capacitor of an output filter of the voltage regulator, the current sensor providing the notification signal by sensing the current drawn by the load.

26. The circuitry of claim 25, wherein the current sensor is a magnetically coupled sensor.

27. The circuitry of claim 25, wherein the current sensor is an explicit resistor or an implicit resistor.

28. The circuitry of claim 27, wherein the implicit resistor includes one or more pins of a package including the load.

29. The circuitry of claim 27, wherein the implicit resistor is a trace.

30. The circuitry of claim 23, wherein the notification signal is a capacitor current at a capacitor of an output filter of the voltage regulator.

31. The circuitry of claim 30, further comprising:

a current sensor coupled in series with the capacitor, the current sensor providing the notification signal by sensing the capacitor current.

32. The circuitry of claim 30, further comprising:

a resistor coupled in series with the capacitor, the resistor having a voltage associated with the capacitor current, the resistor voltage providing the notification signal.

33. The circuitry of claim 1, wherein the state command signal is generated independently of and asynchronously with respect to a switching event and/or a switching frequency of the switch circuitry.

34. The circuitry of claim 15, wherein an output of the error amplifier is coupled to receive the state command signal.

35. The circuitry of claim 15, wherein the current command signal at the input of the modulator includes the error signal in combination with the state command signal.

36. The circuitry of claim 1, further comprising:

an error amplifier having one or more inputs coupled to sense a feedback voltage, the feedback voltage indicating an output voltage of the voltage regulator, the error amplifier configured to compare the feedback voltage with a reference voltage to generate an error signal at an output of the error amplifier; and a modulator having a first input coupled to receive the error signal and a second input coupled to receive the state command signal, the modulator configured to generate a control signal to operate the switch circuitry responsive to the state command signal.

37. The circuitry of claim 36, wherein the second input of the modulator is a current sense input.

38. The circuitry of claim 36, wherein the second input of the modulator is a ramp compensation input.

39. The circuitry of claim 1, wherein:

the voltage regulator is a multi-phase voltage regulator, and the switching control circuitry is configured to operate the switch circuitry to control a plurality of phases of the multi-phase voltage regulator in accordance with the state command signal.

\* \* \* \* \*